US012324778B2

(12) United States Patent
Rigoni et al.

(10) Patent No.: US 12,324,778 B2
(45) Date of Patent: Jun. 10, 2025

(54) APPARATUS AND SYSTEM FOR LIFTING, MOVING, TURNING, AND POSITIONING A PATIENT

(71) Applicant: Sage Products, LLC, Cary, IL (US)

(72) Inventors: Michael J. Rigoni, Cary, IL (US); Garret W. Sweetwood, Cary, IL (US); Gregory T. Davis, Cary, IL (US); Paul M. Fowler, Cary, IL (US)

(73) Assignee: Sage Products, LLC, Cary, IL (US)

( * ) Notice: Subject to any disclaimer, the term of this patent is extended or adjusted under 35 U.S.C. 154(b) by 489 days.

(21) Appl. No.: 17/582,671

(22) Filed: Jan. 24, 2022

(65) Prior Publication Data

US 2022/0142842 A1 May 12, 2022

Related U.S. Application Data

(63) Continuation of application No. 16/557,218, filed on Aug. 30, 2019, now Pat. No. 11,229,570, which is a (Continued)

(51) Int. Cl.
*A61G 7/10* (2006.01)
*A61G 7/00* (2006.01)
*A61G 7/057* (2006.01)

(52) U.S. Cl.
CPC ........... *A61G 7/1051* (2013.01); *A61G 7/001* (2013.01); *A61G 7/05761* (2013.01); (Continued)

(58) Field of Classification Search
CPC ........ A61G 7/10; A61G 7/1051; A61G 7/001; A61G 7/05761; A61G 7/1015; (Continued)

(56) References Cited

U.S. PATENT DOCUMENTS 4,717,257 A * 1/1988 Kaneta ...................... G03F 9/70 356/399
6,079,062 A 6/2000 Mullin
(Continued)

FOREIGN PATENT DOCUMENTS

EP 2 305 200 A2 4/2011

OTHER PUBLICATIONS

Extended European Search Report for EP Application No. 16196770.8, dated Mar. 13, 2017, 7 pages.

*Primary Examiner* — Fredrick C Conley
(74) *Attorney, Agent, or Firm* — FOLEY & LARDNER LLP

(57) ABSTRACT

A patient support device includes a sheet configured to be placed beneath the patient in use and a plurality of straps connected to the sheet and configured for use in moving, lifting, turning, and/or positioning the patient. The straps may include one or more retractable straps that each have a stretchable retraction strap connected thereto and configured for retracting the retractable strap. The straps may also include one or more central support straps connected to the sheet in an area positioned between the legs of the patient. The sheet may also include a head support for supporting the patient's head, which head support may also include one or more straps. The straps may be connected to a hoist, which is then used to lift the patient.

20 Claims, 19 Drawing Sheets

Related U.S. Application Data continuation of application No. 15/340,593, filed on Nov. 1, 2016, now Pat. No. 10,398,614.

(60) Provisional application No. 62/249,719, filed on Nov. 2, 2015.

(52) U.S. Cl.
CPC ......... *A61G 7/1015* (2013.01); *A61G 7/1017* (2013.01); *A61G 7/1021* (2013.01); *A61G 7/1023* (2013.01); *A61G 7/1026* (2013.01); *A61G 7/1028* (2013.01); *A61G 7/1036* (2013.01); *A61G 7/1063* (2013.01); *A61G 7/1084* (2013.01)

(58) Field of Classification Search
CPC .. A61G 7/1017; A61G 7/1021; A61G 7/1023; A61G 7/1026; A61G 7/1028; A61G 7/1036; A61G 7/1063; A61G 7/1084
See application file for complete search history.

(56) References Cited

U.S. PATENT DOCUMENTS

| | | | | |
|---|---|---|---|---|
| 8,789,533 | B2 | 7/2014 | Steffens et al. | |
| 2003/0192118 | A1 | 10/2003 | Carbonneau et al. | |
| 2005/0132495 | A1 | 6/2005 | Girard et al. | |
| 2005/0283907 | A1 * | 12/2005 | Dalton | A61G 7/10 5/89.1 |
| 2006/0080774 | A1 * | 4/2006 | McWattie | A61G 7/1069 5/89.1 |
| 2008/0184488 | A1 * | 8/2008 | Fee | A61G 1/01 5/628 |
| 2011/0126351 | A1 * | 6/2011 | Walker | A61G 7/1015 5/87.1 |
| 2012/0186012 | A1 | 7/2012 | Ponsi et al. | |
| 2012/0186013 | A1 * | 7/2012 | Ponsi | A61G 7/001 5/81.1 R |
| 2012/0210511 | A1 * | 8/2012 | Davis | A61G 7/1051 5/81.1 R |
| 2013/0205495 | A1 * | 8/2013 | Ponsi | A61G 7/10 5/81.1 HS |
| 2013/0276227 | A1 | 10/2013 | Kenalty et al. | |
| 2015/0342810 | A1 * | 12/2015 | Wong | A61G 7/1023 5/83.1 |
| 2017/0119608 | A1 * | 5/2017 | Rigoni | A61G 7/1021 |

* cited by examiner

APPARATUS AND SYSTEM FOR LIFTING, MOVING, TURNING, AND POSITIONING A PATIENT

CROSS-REFERENCE TO RELATED APPLICATIONS

This application is a continuation of U.S. application Ser. No. 16/557,218, filed Aug. 30, 2019, which is a continuation of U.S. application Ser. No. 15/340,593, filed Nov. 1, 2016, which claims priority to and is a non-provisional filing of U.S. Provisional Application No. 62/249,719, filed Nov. 2, 2015, all of which are hereby incorporated by reference herein in their entireties.

TECHNICAL FIELD

The present invention generally relates to an apparatus, system, and method for lifting, moving, turning, and positioning a person on a bed or the like, and, more particularly, to a patient support device having a gripping surface, an absorbent pad, and/or a wedge for use in turning and positioning a person, utilizing high and low friction surfaces and selective glide assemblies to allow, assist, or resist movement of the components of the system in certain directions, and having straps for connecting the device to a hoist for moving the patient, as well as systems and methods including one or more of such apparatuses.

BACKGROUND

Nurses and other caregivers at hospitals, assisted living facilities, and other locations often care for patients with limited or no mobility, many of whom are critically ill or injured and are bedridden. These patients are dependent upon nurses/caregivers to move and are at risk for forming pressure ulcers (bed sores) due to their inability to move. Pressure ulcers develop due to pressure on a patient's skin for prolonged periods of time, particularly over areas where bone or cartilage protrudes close to the surface of the skin because such pressure reduces blood flow to the area, eventually resulting in tissue death. The risk of forming a pressure ulcer is exacerbated by skin surface damage caused by frictional forces and shearing forces resulting from the patient's skin rubbing or pulling against a surface and excessive heat and moisture, which causes the skin to be more fragile and therefore more susceptible to damage.

One area in which pressure ulcers frequently form in an immobile patient lying on his/her back is over the sacral bone (the "sacrum") because the sacrum and supporting mattress surface exert constant and opposing pressure on the skin, resulting in the aforementioned reduction in blood flow. Furthermore, skin in the sacral region is often more susceptible to damage due to shear and friction resulting from the patient being pushed or pulled over the surface of the mattress to reposition him/her, or from sliding down over the surface of the bed when positioned with his/her upper body in an inclined position. Existing devices and methods often do not adequately protect against pressure ulcers in bedridden patients, particularly pressure ulcers in the sacral region.

One effective way to prevent sacral pressure ulcers is frequent turning of the patient, so that the patient is alternately resting on one side or the other, thus avoiding prolonged pressure in the sacral region. A protocol is often used for scheduled turning of a bedridden patient and dictates that a patient should be turned Q2, or every two hours, either from resting at a 30° angle on one side to a 30° angle on the other side, or from 30° on one side to 0°/supine (lying on his/her back) to 30° on the other side. There are, however, several barriers to compliance with this type of protocol, resulting in the patient not being turned as often as necessary, or positioning properly at a side-lying angle, to prevent pressure ulcers. First, turning, positioning, and/or moving patients is difficult and time consuming, typically requiring two or more caregivers. Second, pillows are often stuffed partially under the patient to support the patient's body in resting on his/her left or right side. Pillows, however, are non-uniform and can pose difficulties in achieving consistent turning angles, as well as occasionally slipping out from underneath the patient. Third, patients who are positioned in an inclined position on the bed often slide downward toward the foot of the bed over time, which can cause them to slip off of any structures that may be supporting them. Last, many patient positioning devices cannot be left under a patient for long periods of time because they do not have sufficient breathability and/or compatibility with certain bed functions such as low-air loss (LAL) technology and can be easily stained when soiled.

In addition to being difficult and time-consuming, turning, positioning, and/or transferring patients, and other types of "patient handling" activities, can result in injury to healthcare workers who push, pull, or lift the patient's weight. For healthcare workers, the most prevalent cause of injuries resulting in days away from work is overexertion or bodily reaction, which includes motions such as lifting, bending, or reaching and is often related to patient handling. These injuries can be sudden and traumatic, but are more often cumulative in nature, resulting in gradually increasing symptoms and disability in the healthcare worker.

In recognition of the risk and frequency of healthcare worker injuries associated with patient handling, protocols and/or procedures are often implemented in the healthcare setting. These protocols stress that methods for moving patients should incorporate a form of assistive device to reduce the effort required to handle the patient, thus minimizing the potential for injury to healthcare workers. Such assistance may be accomplished, for example, with the use of low friction sheets or patient hoists or lifts that use pneumatic and/or electrical power to lift the patient partially or entirely off the surface or exert the necessary force to position, turn, or move the patient. Such assistive devices reduce the physical exertion needed from healthcare workers to accomplish the task of moving the patient.

The present disclosure seeks to overcome certain of these limitations and other drawbacks of existing devices, systems, and methods, and to provide new features not heretofore available.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention and the disclosure in a general form as a prelude to the more detailed description provided below.

Aspects of the disclosure relate to a patient support device for use in lifting, moving, turning, and/or positioning a patient, which includes a sheet configured to be placed beneath the patient in use, the sheet having a top surface and a bottom surface, a first strap connected to the sheet at a first connection point and configured for use in moving the patient while supported by the sheet, the first strap having a first free end distal from the first connection point, a first retraction strap connected to the sheet and connected to the first strap at a location between the first connection point and the first free end, a second strap connected to the sheet at a second connection point and configured for use in moving the patient while supported by the sheet, the second strap having a second free end distal from the second connection point, and a second retraction strap connected to the sheet and connected to the second strap at a location between the second connection point and the second free end. The first retraction strap includes a first stretchable material and has a first length when not under tension, and the first strap and the first retraction strap are configured such that extending the first free end to a maximum distance away from the first connection point results in stretching the first retraction strap beyond the first length. The second retraction strap includes a second stretchable material and has a second length when not under tension, and the second strap and the second retraction strap are configured such that extending the second free end to a maximum distance away from the second connection point results in stretching the second retraction strap beyond the second length. The first and second retraction straps may be formed entirely of the first and second stretchable materials in one configuration. Additionally, the stretchable materials of the first and second retraction straps may be the same or different materials.

According to one aspect, the first strap and the first retraction strap are configured such that extending the first free end to the maximum distance away from the first connection point requires exertion of a first tension force on the first retraction strap to stretch the first retraction strap beyond the first length, and such that the first retraction strap returns to the first length upon release of the first tension force. The second strap and the second retraction strap are configured such that extending the second free end to the maximum distance away from the second connection point requires exertion of a second tension force on the second retraction strap to stretch the second retraction strap beyond the second length, and such that the second retraction strap returns to the second length upon release of the second tension force.

According to another aspect, the first and second stretchable materials are capable of being stretched to at least two times an original length of the first or second stretchable material without damage.

According to a further aspect, extending the first free end of the first strap to the maximum distance away from the first connection point results in stretching the first retraction strap to at least two times the first length.

According to yet another aspect, the sheet further includes a pocket, where the first retraction strap is connected to the sheet within the pocket. When the first retraction strap is not under tension, the first retraction strap pulls a portion of the first strap into the pocket, and when the first free end of the first strap is extended to the maximum distance away from the first connection point, the portion of the first strap is outside the pocket. The second retraction strap may also be connected to the sheet within the pocket. In this configuration, when the second retraction strap is not under tension, the second retraction strap pulls a portion of the second strap into the pocket, and when the second free end of the second strap is extended to the maximum distance away from the second connection point, the portion of the second strap is outside the pocket. The first and second connection points may be located within the pocket, such that the pocket has a first opening and a second opening spaced from the first opening, and the first free end of the first strap extends out of the first opening and the second free end of the second strap extends out of the second opening. Alternately, the sheet may further include a second pocket, where the second retraction strap is connected to the sheet within the second pocket. In this configuration, when the second retraction strap is not under tension, the second retraction strap pulls a portion of the second strap into the second pocket, and when the second free end of the second strap is extended to the maximum distance away from the second connection point, the portion of the second strap is outside the second pocket.

According to a still further aspect, a third strap is connected to the sheet at a third connection point and configured for use in moving the patient while supported by the sheet, with the third strap having a third free end distal from the third connection point. A third retraction strap is also connected to the sheet and connected to the third strap at a location between the third connection point and the third free end, where the third retraction strap includes a third stretchable material and has a third length when not under tension, and where the third strap and the third retraction strap are configured such that extending the third free end to a maximum distance away from the third connection point results in stretching the third retraction strap beyond the third length. A fourth strap may further connected to the sheet at a fourth connection point and configured for use in moving the patient while supported by the sheet, with the fourth strap having a fourth free end distal from the fourth connection point, and a fourth retraction strap is connected to the sheet and connected to the fourth strap at a location between the fourth connection point and the fourth free end. The fourth retraction strap includes a fourth stretchable material and has a fourth length when not under tension, and the fourth strap and the fourth retraction strap are configured such that extending the fourth free end to a maximum distance away from the fourth connection point results in stretching the fourth retraction strap beyond the fourth length. As similarly described above, the third and fourth retraction straps may be formed entirely of the third and fourth stretchable materials in one configuration. Additionally, the stretchable materials of the third and fourth retraction straps may be the same or different materials from each other and/or from the stretchable materials of the first and second retraction straps. In one configuration, the first strap may be located along a first side edge of the sheet, the second strap may be located along a second side edge of the sheet opposite the first side edge, the third strap may be located along a head edge of the sheet configured to be positioned proximate a head of the patient, and the fourth strap may be located along the head edge of the sheet.

According to another aspect, the first free end of the first strap and the second free end of the second strap each has a connection member configured for connection to a hoist.

According to an additional aspect, the device includes at least one safety strap configured to be releasably connected to wrap around a torso of the patient. For example, the device may include a pair of safety straps connected proximate opposed side edges of the sheet and having complementary releasable connection mechanisms, such that the safety straps are configured to be releasably connected to each other to wrap around a torso of the patient.

According to another additional aspect, the sheet has a high-friction material forming at least a portion of the top surface and a low-friction material forming at least a portion of the bottom surface, where the high-friction material has greater resistance to sliding than the low-friction material.

According to a further additional aspect, the device includes a pair of central support straps connected to the sheet at connection points located between a head edge and a foot edge and approximately midway between opposed side edges of the sheet, and a head support connected to the sheet proximate the head edge and extending outwardly from the head edge. Each of the central support straps extends from the top surface of the sheet and is configured for connection to a hoist for lifting the sheet and the patient, such that the central support straps are configured to be placed between legs of the patient during lifting. The head support is configured for connection to the hoist for lifting the sheet and the patient, such that the head support is configured for supporting the head of the patient when the sheet and the patient are lifted, to maintain the head of the patient in an inclined position during lifting.

Additional aspects of the disclosure relate to a patient support device for use in lifting, moving, turning, and/or positioning a patient, which includes a sheet configured to be placed beneath the patient in use, the sheet having a top surface and a bottom surface, a first strap connected to the sheet at a first connection point and configured for use in moving the patient while supported by the sheet, the first strap having a first free end distal from the first connection point, a first retraction strap connected to the sheet and connected to the first strap at a location between the first connection point and the first free end, a second strap connected to the sheet at a second connection point and configured for use in moving the patient while supported by the sheet, the second strap having a second free end distal from the second connection point, and a second retraction strap connected to the sheet and connected to the second strap at a location between the second connection point and the second free end. The first retraction strap includes a stretchable material and has a first length when not under tension, and the first strap and the first retraction strap are configured such that placing the first strap under tension by a first force exerted on the first free end results in stretching the first retraction strap beyond the first length. The second retraction strap includes the stretchable material and has a second length when not under tension, and wherein the second strap and the second retraction strap are configured such that placing the second strap under tension by a second force exerted on the second free end results in stretching the second retraction strap beyond the second length.

According to one aspect, the first strap, the first retraction strap, the second strap, and the second retraction strap are configured such that when the first force and the second force are released, the first retraction strap returns to the first length and the second retraction strap returns to the second length, pulling the first and second free ends toward the sheet.

Further aspects of the disclosure relate to a method of using a patient support device according to aspects described above, including placing the patient above the top surface of the sheet, and moving the patient and the sheet by exerting a force on at least one of the first and second straps. During this movement, when the first strap is placed under tension by the force, the first retraction strap is stretched beyond the first length. Likewise, when the second strap is placed under tension by the force, the second retraction strap is stretched beyond the second length. Additional structures may be placed between the patient and the top surface of the sheet, such as an absorbent body pad.

According to one aspect of the method, moving the patient includes connecting the first free end of the first strap and the second free end of the second strap to a hoist and raising the hoist to exert an upward force on the first and second straps to place the first and second straps under tension and thereby lift the sheet and the patient. When the first strap is placed under tension by the upward force, the first retraction strap is stretched beyond the first length, and when the second strap is placed under tension by the upward force, the second retraction strap is stretched beyond the second length. The method may further include lowering the hoist and disconnecting the first and second free ends from the hoist such that the first and second straps are not under tension. When the first and second straps are released from the hoist, the first retraction strap returns to the first length and the second retraction strap returns to the second length, pulling the first and second free ends toward the sheet.

Other aspects of the disclosure relate to a patient support device for use in lifting, moving, turning, and/or positioning a patient, which includes a sheet configured to be placed beneath the patient in use, the sheet having a top surface and a bottom surface and being defined by a head edge configured to be placed proximate a head of the patient, a foot edge opposite the head edge, and opposed side edges extending between the head edge and the foot edge, a pair of central support straps connected to the sheet at connection points located between the head edge and the foot edge and approximately midway between the opposed side edges, and a head support connected to the sheet proximate the head edge and extending outwardly from the head edge. Each of the central support straps extends from the top surface of the sheet and is configured for connection to a hoist for lifting the sheet and the patient, such that the central support straps are configured to be placed between legs of the patient during lifting. The head support is configured for connection to the hoist for lifting the sheet and the patient, such that the head support is configured for supporting the head of the patient when the sheet and the patient are lifted, to maintain the head of the patient in an inclined position during lifting. The central support straps may have equal lengths in one configuration.

According to one aspect, the connection points of the central support straps are located more proximate to the foot edge than the head edge. The device may also include a plurality of additional straps connected to the sheet and configured for connection to the hoist for lifting the sheet and the patient, wherein at least one of the additional straps is connected proximate the head edge of the sheet, and wherein the at least one of the additional straps connected proximate the head edge has a length that is smaller than a length of either of the central support straps, such that the device is configured to support the head of the patient in an elevated position relative to the legs of the patient.

According to another aspect, the sheet has a hole positioned proximate the connection points of the central support straps, and the central support straps extend through the hole and connect to the bottom surface of the sheet. The device may also include a piece of reinforcing material positioned around the hole.

According to a further aspect, the head support is at least partially formed of a stretchable material with greater elasticity than materials of the sheet and the central support straps. The head support may further be at least partially formed of a low-friction material positioned at a central portion of the head support, where the low-friction material has a lower coefficient of friction than the stretchable material, and the stretchable material has greater elasticity than low-friction material.

According to yet another aspect, the head support includes a first head support strap on a left side of the head support and a second head support strap on a right side of the head support, where the first and second head support straps are configured for connection to the hoist.

According to a still further aspect, the sheet has a high-friction material forming at least a portion of the top surface and a low-friction material forming at least a portion of the bottom surface, wherein the high-friction material has greater resistance to sliding than the low-friction material.

According to another aspect, the device further includes a first strap connected to the sheet at a first connection point and configured for use in moving the patient while supported by the sheet, the first strap having a first free end distal from the first connection point, a first retraction strap connected to the sheet and connected to the first strap at a location between the first connection point and the first free end, a second strap connected to the sheet at a second connection point and configured for use in moving the patient while supported by the sheet, the second strap having a second free end distal from the second connection point, and a second retraction strap connected to the sheet and connected to the second strap at a location between the second connection point and the second free end. The first retraction strap includes a first stretchable material and has a first length when not under tension, and the first strap and the first retraction strap are configured such that extending the first free end to a maximum distance away from the first connection point results in stretching the first retraction strap beyond the first length. The second retraction strap includes a second stretchable material and has a second length when not under tension, and the second strap and the second retraction strap are configured such that extending the second free end to a maximum distance away from the second connection point results in stretching the second retraction strap beyond the second length.

Still further aspects of the disclosure relate to a method of using a patient support device according to aspects described above, including placing a patient above the top surface of the sheet such that the central support straps are placed between the legs of the patient, and the head of the patient is positioned proximate the head support, attaching the central support straps and the connection member of the head support to a hoist, and raising the hoist to lift the sheet and the patient. During lifting, the head of the patient is supported by the head support, to maintain the head of the patient in an inclined position. Additional structures may be placed between the patient and the top surface of the sheet, such as an absorbent body pad.

According to one aspect of the method, the connection points of the central support straps are located more proximate to the foot edge than the head edge, and the device further comprises a plurality of additional straps connected to the sheet and configured for connection to the hoist for lifting the sheet and the patient. At least one of the additional straps is connected proximate the head edge of the sheet and has a length that is smaller than a length of either of the central support straps, such that when the sheet and the patient are lifted, the device supports the head of the patient in an elevated position relative to the legs of the patient.

Yet additional aspects of the invention relate to a patient support device and/or a method of using the same as described above, which includes features according to a combination of aspects described above. For example, the patient support device may include a head support, central support straps, and retractable straps with retraction straps, as well as additional features according to various aspects described above. As another example, a method of using the device may include exerting force on some or all of these straps, such as by use of a hoist that is connected to the straps.

Other features and advantages of the invention will be apparent from the following description taken in conjunction with the attached drawings.

BRIEF DESCRIPTION OF THE DRAWINGS

To understand the present invention, it will now be described by way of example, with reference to the accompanying drawings in which.

DETAILED DESCRIPTION

Figure 1:
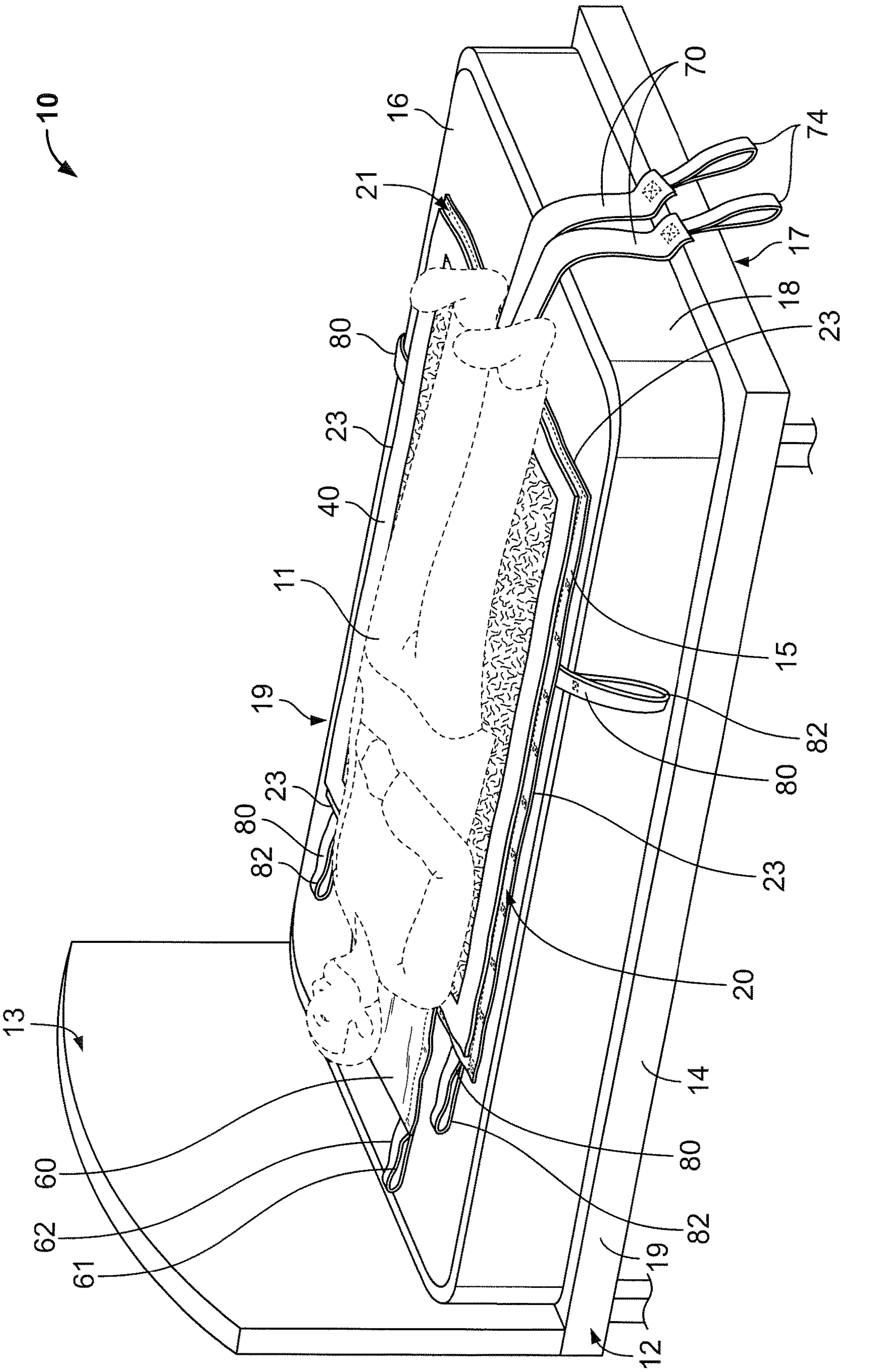
FIG. 1 is a perspective view of one embodiment of a system for use in turning and positioning a patient, according to aspects of the disclosure, with a patient shown in broken lines supported by a patient support device.

While this invention is capable of embodiment in many different forms, there are shown in the drawings, and will herein be described in detail, certain embodiments of the invention with the understanding that the present disclosure is to be considered as an example of the principles of the invention and is not intended to limit the broad aspects of the invention to the embodiments illustrated and described.

In general, aspects of the disclosure relate to a system, including a patient support device with straps for connection to a hoist or similar mechanism, an absorbent body pad configured to be placed over the device, and one or more wedges configured to be placed underneath the device to support the patient in various positions, where the wedge(s) and the device form one or more selective gliding assemblies, as well as systems including one or more of such devices and methods utilizing one or more of such systems and/or devices. Various embodiments of the invention are described below.

Referring now to the figures, and initially to FIGS. 1-8, there is shown an example embodiment of a system 10 for use in turning and positioning a person resting on a surface, such as a patient lying on a hospital bed. As shown in FIG. 1, the system 10 includes a patient support device (hereinafter, "device") 20, an absorbent body pad 40 configured to be placed over the device 20, and one or more wedges 50A-B configured to be placed under the device 20. The patient can be positioned on top of the body pad 40, with the body pad 40 lying on the device 20, and one or more wedges 50A-B optionally positioned underneath the device 20.

As shown in FIGS. 1-8, the system 10 is configured to be placed on a bed 12 or other support apparatus underneath a person lying in a supine position. The bed 12 generally includes a frame 14 and a supporting surface 16 supported by the frame 14, as shown in FIG. 1, and has a head 13, a foot 17 opposite the head 13, and opposed sides or edges 19 extending between the head 13 and the foot 17. The supporting surface 16 can be provided by a mattress 18 or similar structure, and in various embodiments, the mattress 18 can incorporate air pressure support, alternating air pressure support, and/or low-air-loss (LAL) technology. These technologies are known in the art and utilize a pump motor or motors (not shown) to effectuate airflow into, over, and/or through the mattress 18. For beds having LAL technology, the top of the mattress 18 may be breathable so that the airflow can pull heat and moisture vapor away from the patient. The bed 12 may also include one or more bed sheets (such as a fitted sheet or flat sheet), as well as pillows, blankets, additional sheets, and other components known in the art. Further, the bed 12 may be an adjustable bed, such as a typical hospital-type bed, where the head 13 (or other parts) of the bed 12 can be raised and lowered, such as to incline the patient's upper body. It is understood that the system 10 and the components thereof can be used with other types of beds 12 as well.

FIGS. 1-8 illustrate an example embodiment of the device 20, which is in the form of a sheet 15 having a top surface 21 and a bottom surface 22 defined by a plurality of peripheral edges 23. It is understood that the sheet 15 may not be a single-layer structure, and may have multiple layers, such as in the embodiment of FIGS. 11-12A. It is also understood that when components are described herein as being connected to and/or interacting with the device 20, such components can be considered to be connected to and/or interacting with the sheet 15 forming the body of the device 20. The device 20 is configured to be positioned on the bed 12 so that the bottom surface 22 is above the supporting surface 16 of the bed 12 and faces or confronts the supporting surface 16, and is supported by the supporting surface 16. As used herein, "above," "below," "over," and "under" do not imply direct contact or engagement. For example, the bottom surface 22 being above the supporting surface 16 means that that the bottom surface 22 may be in contact with the supporting surface 16, or may face or confront the supporting surface 16 and/or be supported by the supporting surface 16 with one or more structures located between the bottom surface 22 and the supporting surface 16, such as a bed sheet as described above. Likewise, "facing" or "confronting" does not imply direct contact or engagement, and may include one or more structures located between the surface and the structure it is confronting or facing.

Figure 5:
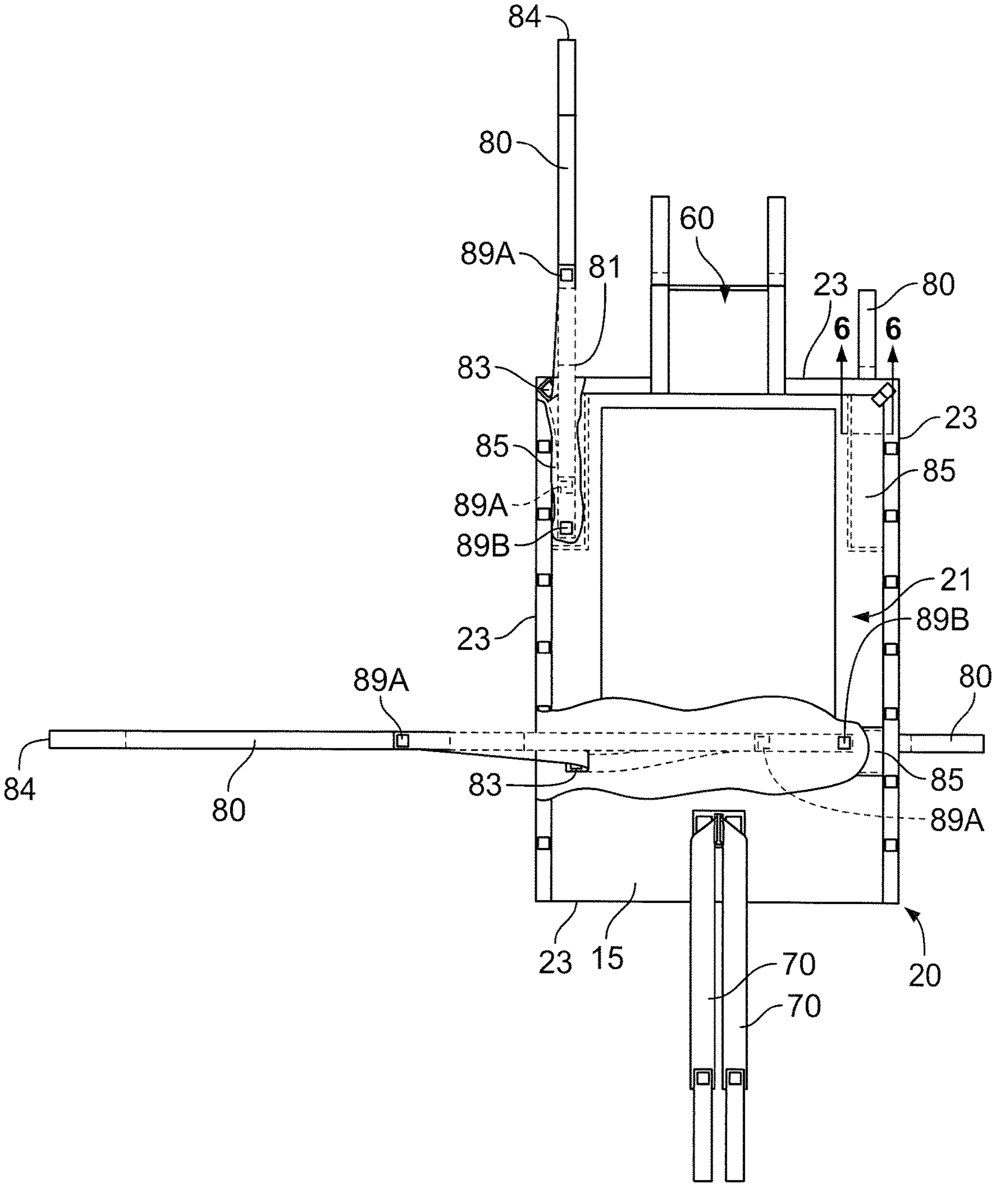
FIG. 5 is a partially broken-away top view of the system and device of FIG. 1, with movement of straps between extended and retracted positions illustrated in broken lines.
Figure 6:
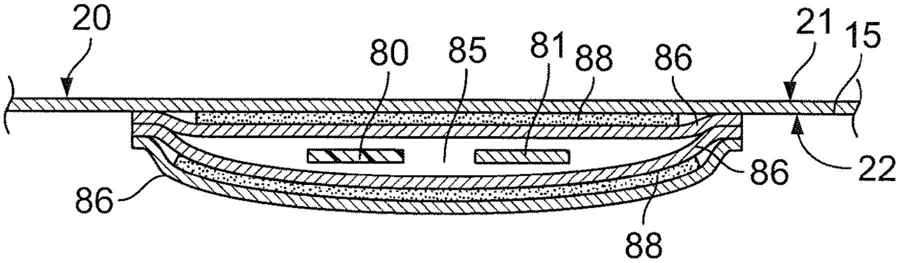
FIG. 6 is a cross-sectional view taken along lines 6-6 of FIG. 5.
Figure 7:
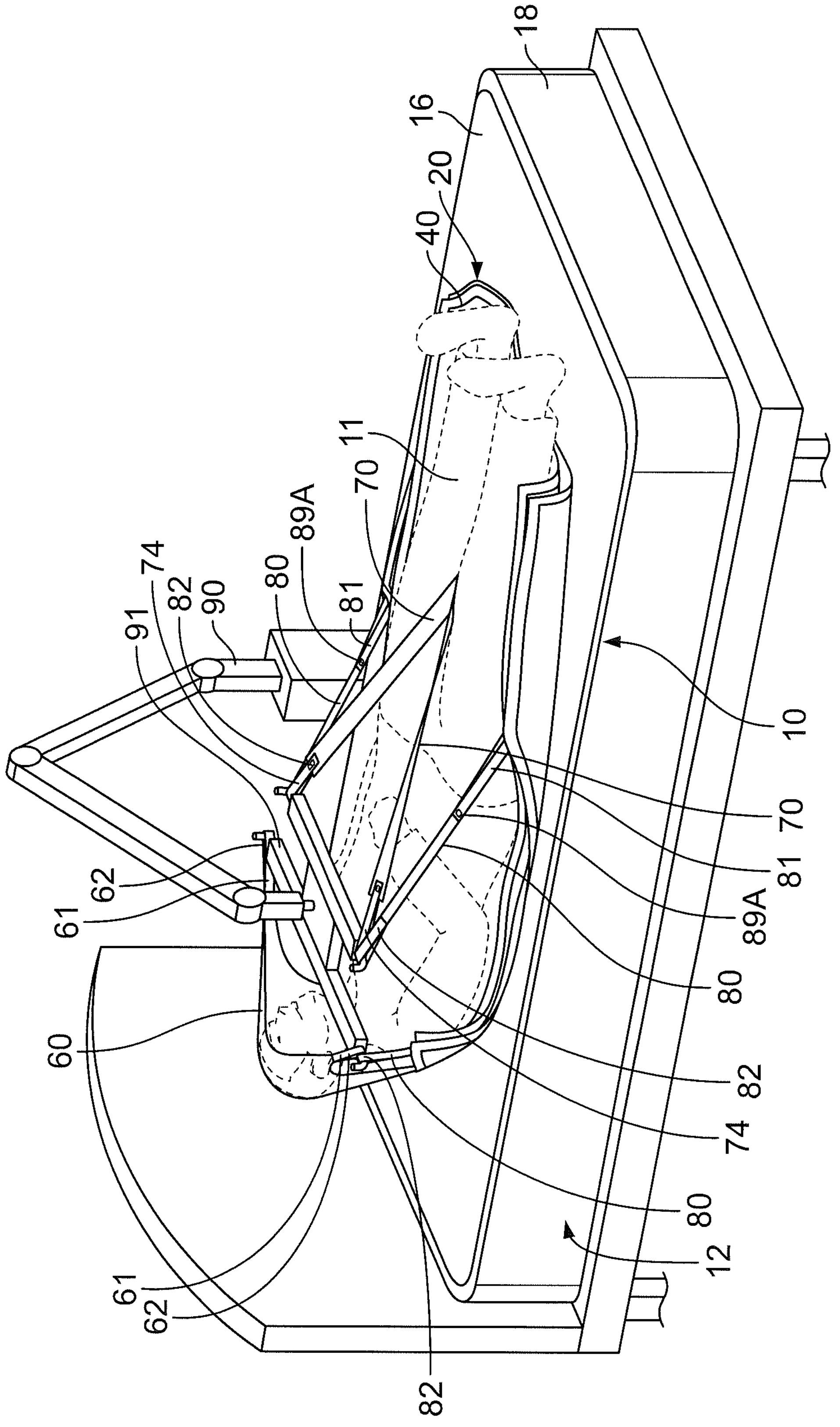
FIG. 7 is a perspective view of the system and device of FIG. 1, with a patient supported by the device shown in broken lines, and a hoist in position to lift the device.
Figure 8:
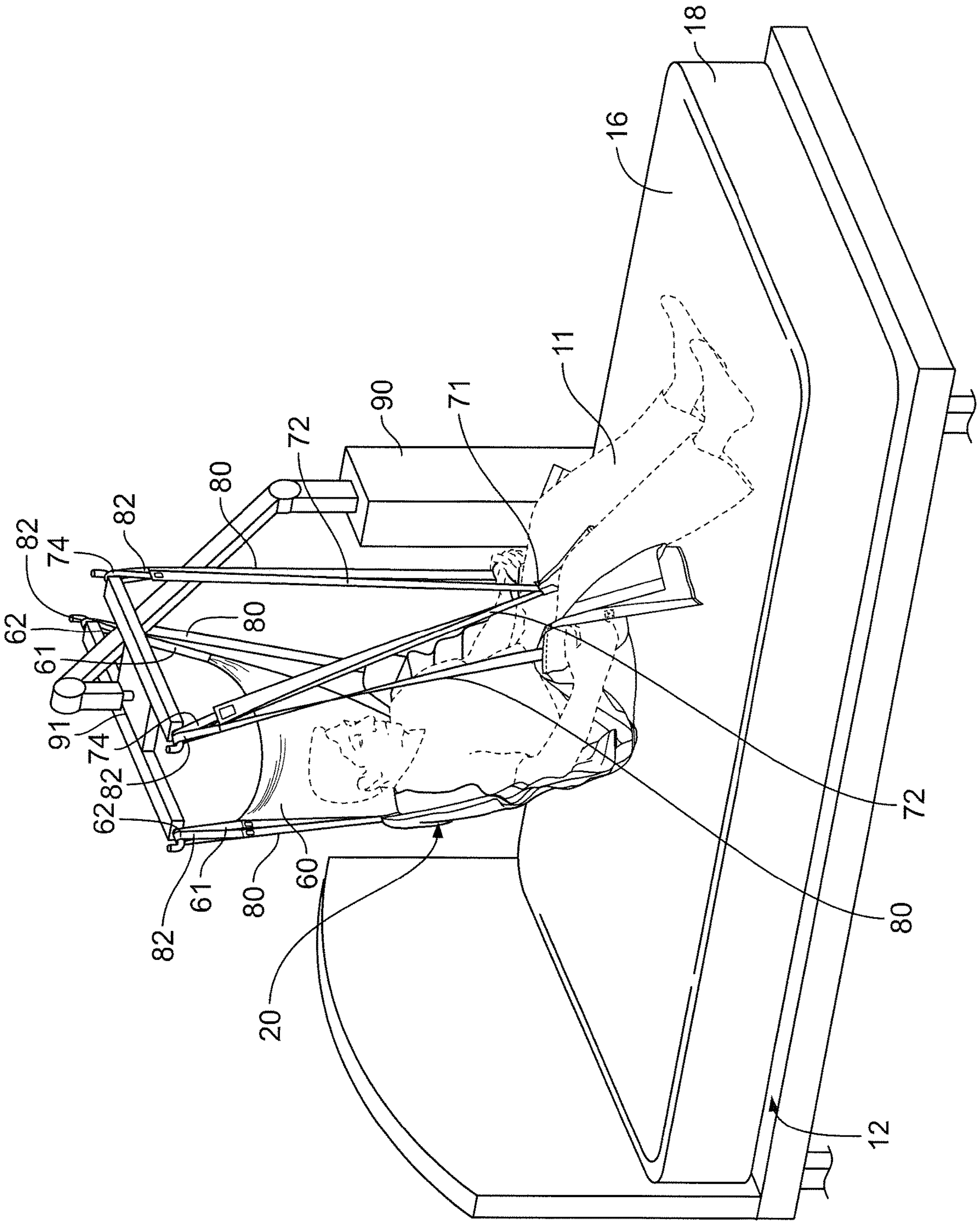
FIG. 8 is a perspective view of the system, device, and hoist of FIG. 7, showing the hoist lifting the device and patient.

In the example embodiment illustrated in FIGS. 1-8, the device 20 is configured for connection to a hoist 90 for lifting the device 20 and the patient 11 on top of the device 20. In another embodiment, the device 20 may not be configured for lifting, and it is understood that certain components and features of the device 20 may be useful in a patient support device that is not configured for lifting. The device 20 in the embodiment of FIGS. 1-8 has a head support 60 near the head edge 23 that is configured to support the head of the patient 11 when the device 20 is lifted. The device 20 in FIGS. 1-8 also has a plurality of straps configured for connection to a hoist 90 for lifting the patient 11, as shown in FIGS. 7-8. The straps may include one or more head support straps 61 connected to the head support 60, one or more central support straps 70 connected to a center or middle portion of the device 20, and one or more peripheral straps 80 connected to the device 20 to support the edges 23 of the device 20. At least some of the straps 61, 70, 80 may be configured to be retractable toward the device 20 in various embodiments, and in the embodiment of FIGS. 1-8, the peripheral straps 80 are configured to be retractable, as described herein.

The head support 60 in the embodiment of FIGS. 1-8 is connected to the device 20 at or proximate to the head edge 23 and extends outwardly from the head edge 23 to provide support for the head of the patient 11 during lifting. The head support 60 may have structures for connection to the hoist 90 during lifting, and in one embodiment, the head support 60 may have two head support straps 61 configured for connection to the hoist 90, as shown in FIGS. 1-8. In other embodiments, the head support 60 may include a different number of straps 61 and/or a different structure for connection to the hoist 90. The head support straps 61 have connection structures 62 for connection to the hoist 90, which may be in the form of loops, as shown in FIGS. 1-8, which may be permanent loops or fastened loops (e.g., by using buttons, snaps, hook-and-loop, or other fasteners). During lifting, the device 20 and the head support 60 may be configured to support the head and upper body of the patient 11 in an elevated position relative to the lower body of the patient 11, as shown in FIG. 8. In this configuration, the head support straps 61 may have lengths that are shorter (measured from the closest edge 23 of the device 20) than the central support straps 70 and/or the peripheral straps 80 located toward the middle and bottom/foot edge 23 of the device 20, thereby elevating the patient's head.

Figure 9:
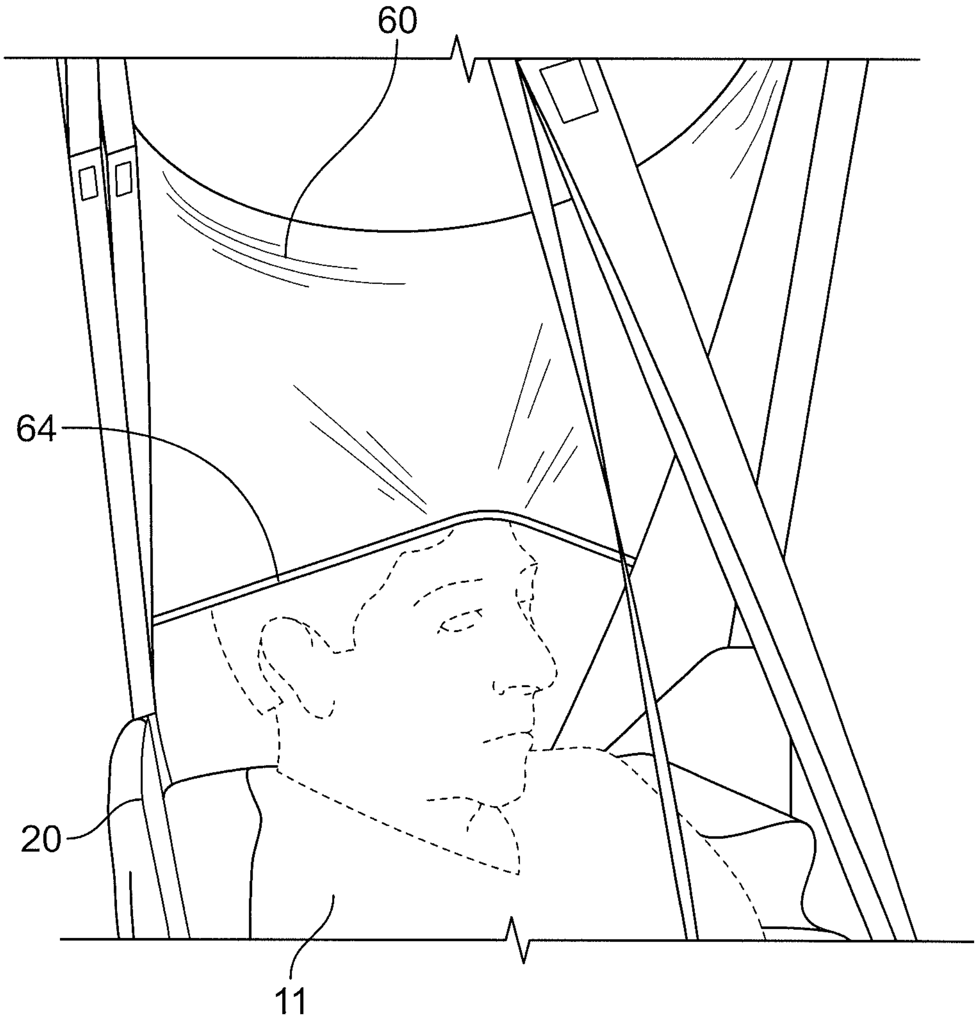
FIG. 9 is a perspective view of a portion of another embodiment of a patient support device according to aspects of the disclosure, with a patient shown in broken lines.

The head support 60 may be made from a flexible material that is stretchable or elastic (e.g., Lycra/Spandex), having greater elasticity and being capable of a greater degree of stretching than the material of the sheet 15 and/or the material of the straps 61, 70, 80 in one embodiment. The head support 60 in the embodiment of FIGS. 1-8 has a more rigid or inelastic support material 63 connected along the edges of the head support 60, to provide structural support, with a webbing of the elastic material extending between the support material 63. In the embodiment shown in FIGS. 1-8, the support material 63 extends from the head support straps 61 to the body of the device 20, to provide a structural link between the straps 61 and the device, and the support material 63 may be made from the same material as the head support straps 61 and/or may form integral pieces with the head support straps 61 in various embodiments. The head support straps 61 and/or the support material 63 may be formed of the same material as the handles 28 in one embodiment. The head support 60 may have a different configuration in other embodiments. For example, in one embodiment, the head support 60 may further include a flap 64 extending across the front of the patient's head (e.g., the forehead) to assist in retaining the patient's head in position, as shown in FIG. 9. The flap 64 may be in a "hood" configuration as shown in FIG. 9 or may be in the form of a band of material, and the flap 64 may be permanently connected to the head support 60 or may be releasable by fastening in various embodiments.

The embodiment of FIGS. 1-8 has two central support straps 70 connected to a center or middle portion of the device 20 and extending outwardly from the top surface 21 of the device, although it is understood that a greater or smaller number of central support straps 70 may be used in other embodiments. The central support straps 70 may be made from a rigid and/or inelastic material, and may be made from the same material as the material of the sheet 15 or the material of the handles 28 in various embodiments. The central support straps 70 may be configured to provide load-bearing support during lifting of the device 20 and the patient 11 and/or to separate the legs of the patient 11 during lifting. Forming the central support straps 70 of the material of the sheet 15 permits the straps 70 to lie flat and not create any pressure points on the patient 11 when not in use.

Figure 2:
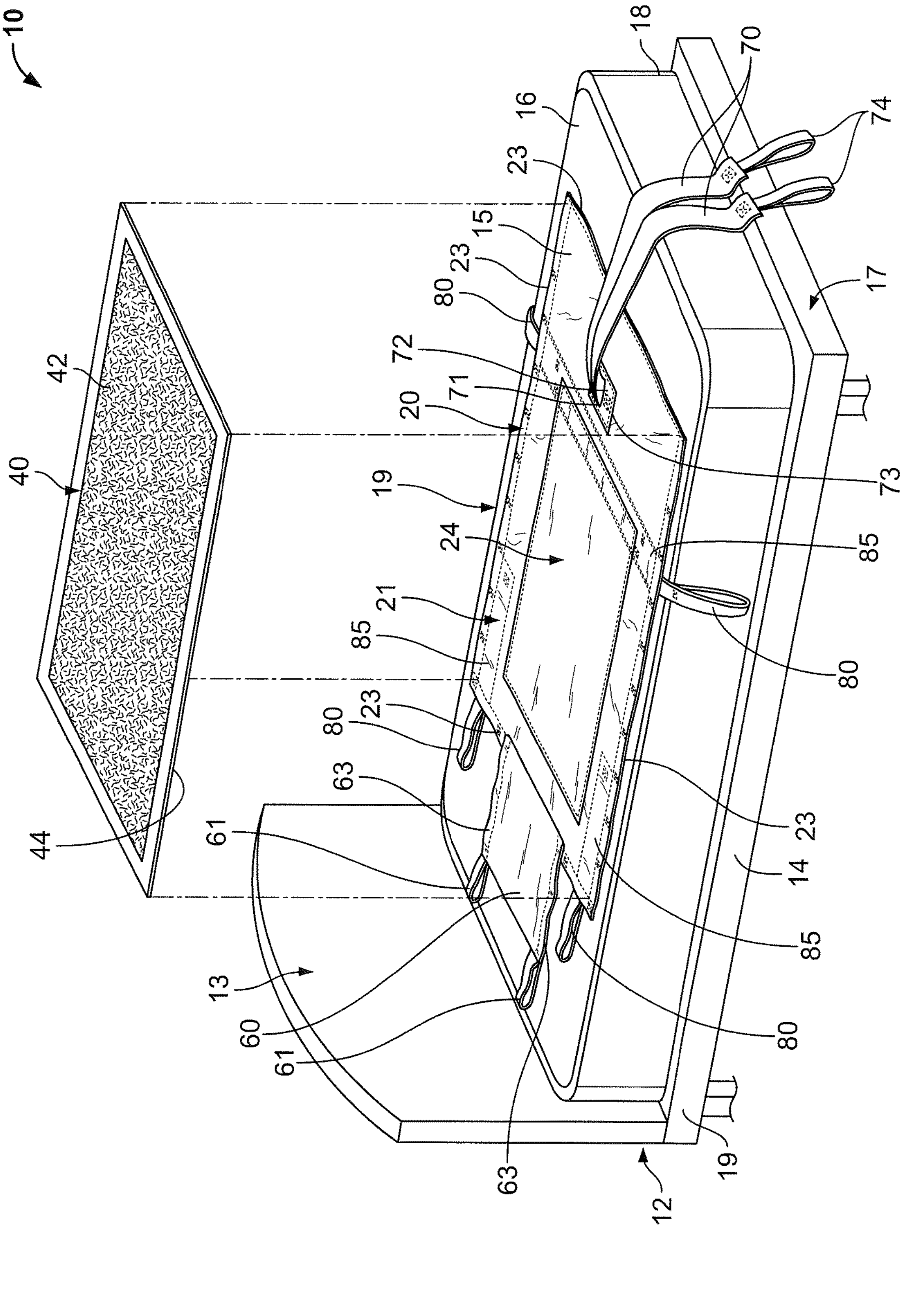
FIG. 2 is a partially-exploded perspective view of the system of FIG. 1.
Figure 3:
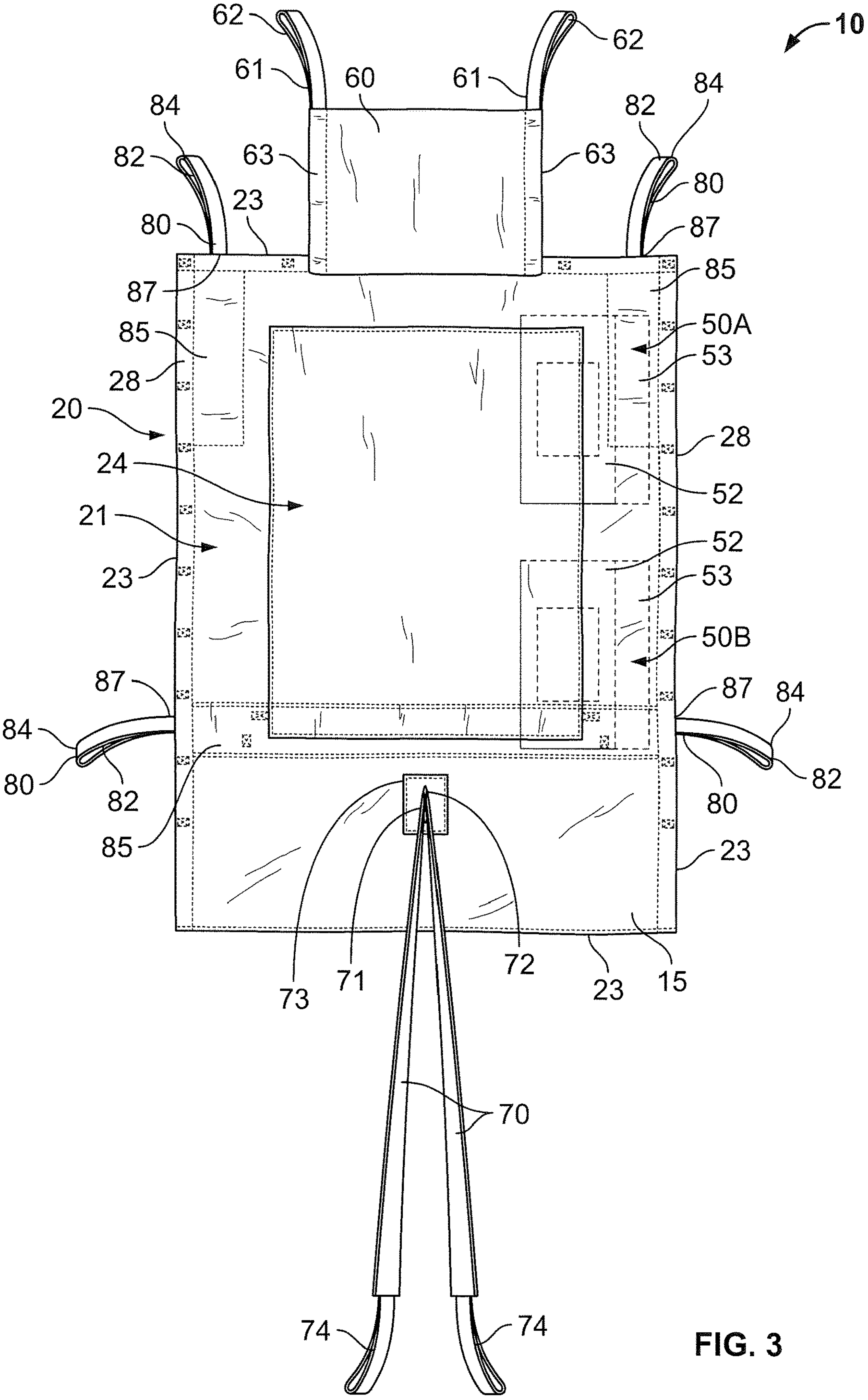
FIG. 3 is a top view of the system of FIG. 1, with two wedges shown in broken lines beneath the patient support device.
Figure 4:
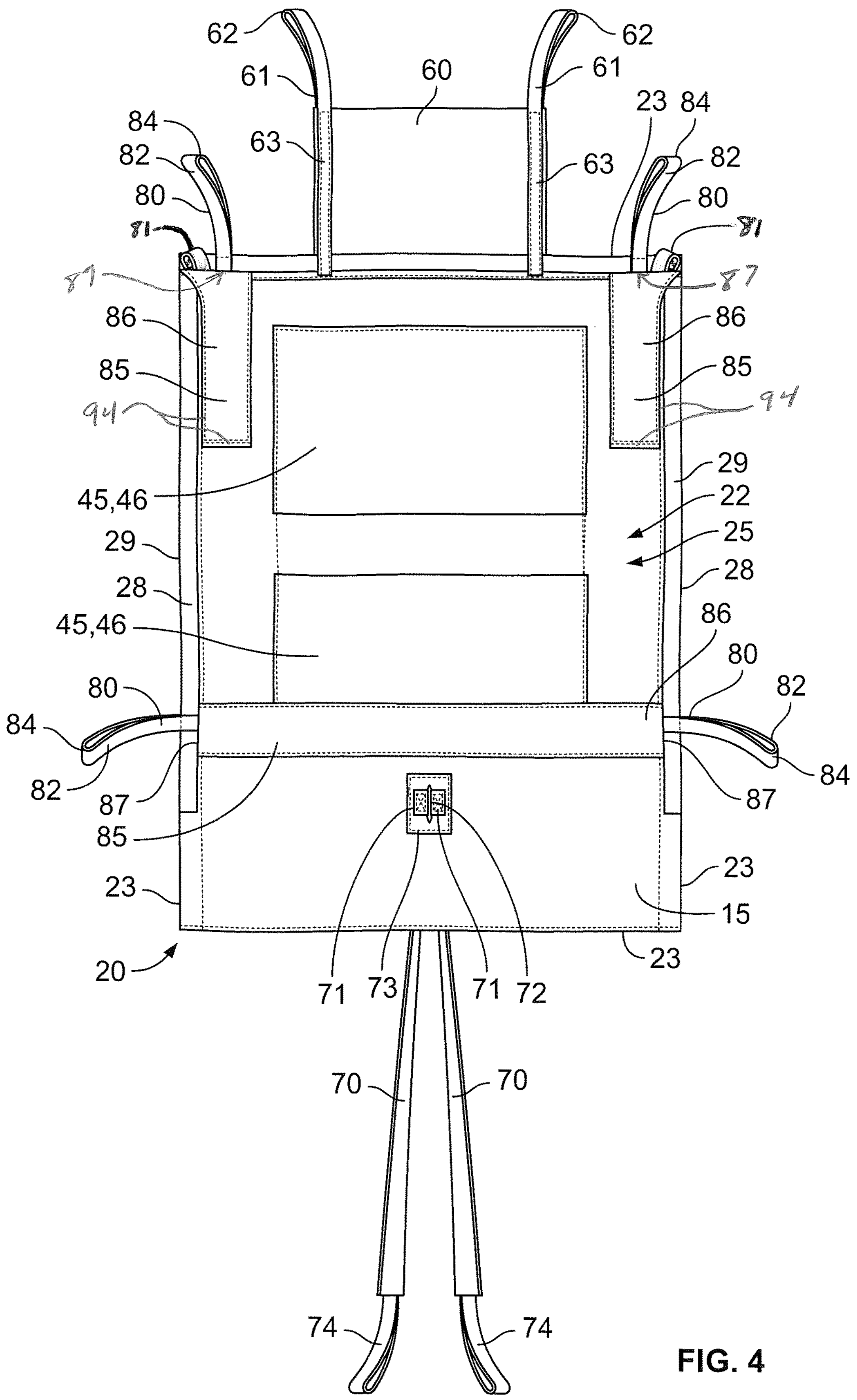
FIG. 4 is a bottom view of the system and device of FIG. 1.

The central support straps 70 may be connected to the device 20 at one or more connection points 71 located between the head and foot edges 23 of the device 20, and generally along a lateral centerline of the device, i.e., midway between the side edges 23. In the embodiment of FIGS. 1-8, the connection points 71 of the two central support straps 70 are positioned very close to the lateral centerline on opposite sides of the lateral centerline, and the connection points 71 of the two central support straps 70 are so close to each other that the two straps 70 may be considered to have a single connection point 71. In this position, the central support straps 70 help to spread the legs of the patient 11 to prevent them from being pressed together and to resist sliding of the patient 11 forward and off of the device 20 during lifting. The central support straps 70 are connected to the device 20 in the embodiment of FIGS. 1-8 by extending through a hole 72 in the device 20 and connecting to the bottom surface 22, such as by stitching, for example, a single or multiple box-stitch. The device 20 may have a reinforcing material 73 positioned around at least a portion of the hole 72 to provide structural support for connection of the central support straps 70 in one embodiment, such as shown in FIGS. 3-4. In other embodiments, the device 20 may have multiple holes 72 that may have reinforcing material 73, and/or the central support straps 70 may be connected to the top surface 22 of the device 20. Additionally, in other embodiments, the connection points 71 may be positioned farther apart, and may also be positioned symmetrically to the lateral centerline of the device 20, i.e., laterally aligned and spaced substantially equal distances on either side of the lateral centerline. The central support straps 70 have connection structures 74 for connection to the hoist 90, which may be in the form of loops, as shown in FIGS. 1-8, such as permanent loops or fastened loops (e.g., by using buttons, snaps, hook-and-loop, or other fasteners). The central support straps 70 may have different configurations in other embodiments.

The peripheral straps 80 in the embodiment of FIGS. 1-8 are configured to be retractable straps that can be extended when in use (e.g., under tension) and are retracted inwardly when not in use. The device 20 in FIGS. 1-8 includes four peripheral straps 80, including two straps 80 positioned at the corners of the head edge 23 and extending outwardly from the head edge 23 and two straps 80 positioned in a middle area of the device 20 between the head and foot edges 23, extending outwardly from the opposed side edges 23 of the device 20. Each of the peripheral straps 80 in the embodiment of FIGS. 1-8 is connected to the device 20 (i.e., to the sheet 15) at a connection point 83, which may be at a proximal end of the peripheral strap 80, and a distal end or free end 84 which is distal from the connection point 83, and the maximum distance that the free end 84 of each peripheral strap 80 can extend away from the device 20 is approximately equal to the length of the peripheral strap 80 defined between the connection point 83 and the free end 84. The peripheral straps 80 may be connected to the device 20 by stitching or any other connection technique described herein. In other embodiments, the device 20 may include a different number of peripheral straps 80, some or all of which may be retractable, and/or multiple retraction straps 81 for each peripheral strap 80.

The peripheral straps 80 are retracted in this embodiment by use of retraction straps 81 that are connected to the device 20 and to the peripheral straps 80, such as by stitching or other connection technique described herein. Connection points 89A between the retraction straps 81 and the peripheral straps 80 and connection points 89B between the retraction straps 81 and the device 20 (i.e., the sheet 15) are illustrated in FIG. 5. In general, the retraction straps 81 in the embodiment of FIGS. 1-8 are formed of a stretchable and/or elastic material that stretches when the peripheral strap 80 is extended outwardly under tension and retracts inwardly toward the device 20 when the tension is released. The stretchable/elastic material of the retraction straps 81 is generally capable of stretching to a greater degree than the material(s) of the peripheral straps 80, and in one embodiment, the stretchable/elastic material of the retraction straps 81 is capable of stretching to at least 2× its original length without permanent damage or breakage, and can return to its original length when the tension is released. The peripheral straps 80 may be formed of a strong, relatively inelastic material (e.g., nylon) for supporting the weight of the device 20 and the patient 11 while lifting. In the configuration of FIGS. 1-8, exerting a tension force on the peripheral straps 80 away from the device 20 causes the peripheral straps 80 to be pulled away from the device, exerting the tension on the retraction straps 81 to stretch the retraction straps 81 beyond their original (un-stretched) lengths. Once the peripheral straps 80 have been pulled to the point where there is tension in the peripheral straps, the strength of the peripheral straps 80 absorbs the tension to permit lifting and/or other movement of the device 20 by pulling on the peripheral straps 80. FIG. 5 illustrates the extension of the peripheral straps 80 and the resultant stretching of the retraction straps 81, with the original positions of the peripheral straps 80 and the retraction straps 81 shown in broken lines, and the fully-extended positions shown in solid lines. It is understood that FIG. 5 is partially schematic, and that the retraction mechanism of only one of the peripheral straps 80 located in the middle portion of the device 20 is illustrated. The peripheral straps 80 have connection structures 82 for connection to the hoist 90, which may be in the form of loops, as shown in FIGS. 1-8, such as permanent loops or fastened loops (e.g., by using buttons, snaps, hook-and-loop, or other fasteners).

The specific retraction structure utilized for each peripheral strap 80 in the embodiment of FIGS. 1-8 includes the retraction strap 81 connected to the device 20 (i.e., connected to the sheet 15) and connected to the peripheral strap 80 at a location between the connection point 83 and the free end 84 of the peripheral strap 80. Extending the free end 84 to the maximum distance away from the connection point 83 places the peripheral strap 80 under tension and results in stretching the retraction strap 81 as described above. As illustrated in FIGS. 3 and 5, each peripheral strap 80 is connected proximate the side edge 23 from which the peripheral strap 80 extends, so that the peripheral strap 80 exerts force near the side edge 23 during lifting or movement. The corresponding retraction strap 81 in this embodiment is connected proximate the opposite side edge 23, such that the original (un-stretched) length of the retraction strap 81 is smaller than the distance from the point where the retraction strap 81 is connected to the side edge 23 from which the peripheral strap 80 extends. In this configuration, no portion of the retraction strap 81 extends outside the edges 23 of the sheet 15 when the retraction strap 81 is retracted, and at least a portion of the peripheral strap 80 is therefore retracted inwardly of the edges 23 of the sheet 15. Additionally, the peripheral strap 80 and the corresponding retraction strap 81 may be dimensioned such that a small portion of the length of the peripheral strap 80 remains extending outwardly of the edges 23 of the sheet 15 when retracted, as shown in FIGS. 1-5, to provide easy access to the peripheral straps 80. This retraction of the peripheral strap 80 helps prevent the peripheral strap 80 from becoming a nuisance or a hazard by dangling and potentially becoming tangled with caregivers, the patient 11, and/or medical equipment. Such entanglement may cause falls or accidents, or may result in strangulation or other constriction of the patient's body, particularly in immobile patients. In another embodiment, a different retraction mechanism may be used.

In the embodiment of FIGS. 1-8, the device 20 has pockets 85, and the peripheral straps 80 are retractable at least partially within the pockets 85 when not in use, to provide additional containment of the straps 80. The retraction straps 81 are connected to the device 20 within the pockets 85 in this embodiment, such that the retraction straps 81 pull the peripheral straps 80 into the pockets 85 when they retract. The connection points 83 of the peripheral straps 80 are also positioned within the pockets 85 in the embodiment of FIGS. 1-8, although the connection points 83 may be positioned outside the pockets 85 in other embodiments. The pockets 85 in the embodiment of FIGS. 1-8 are formed by additional panels 86 of material connected to the bottom surface 22 of the device 20, which may be formed of the same material as the sheet 15 in one embodiment. Each pocket 85 in this embodiment has a plurality of enclosed boundaries 94 and an opening 87 proximate the edge 23 from which the respective peripheral strap 80 is configured to extend. The openings 87 are exposed on the bottom side 22 of the device 20 and are recessed slightly from the edges 23 of the sheet 15 in the embodiment of FIGS. 1-8, but this configuration may be different in other embodiments. The openings 87 of the pockets 85 near the head edge 23 are flared to enable wider range of motion of the peripheral straps 80 when extended, as well as to ease retraction of the peripheral straps 80 by reducing friction or snagging of the straps 80 on the edges of the opening 87. The flared openings 87 are illustrated in FIG. 4, and this flared configuration is created by the outer boundary 94 of each pockets 85 (i.e., the boundary 94 closest to the side edge 23 of the device 20) having an outward curvature proximate the openings 87. The device 20 in FIGS. 1-8 has three pockets 85, including one pocket 85 at each corner of the head edge 23 for the two peripheral straps 80 extending from the head edge 23 and a single pocket 85 located across the central area of the device 20 and accommodating both of the peripheral straps 80 extending from the opposed side edges 23. The central pocket 85 has openings 87 at both ends, proximate both of the opposed side edges 23, such that one peripheral strap 80 extends from each opening 87, and the pockets 85 near the head edge 23 have a single opening 87 and a closed end opposite the opening 87. In another embodiment, each peripheral strap 80 may have a separate, individual pocket 85, e.g., the peripheral straps 80 extending from the opposed side edges 23 may have separate pockets 85. In a further embodiment, some or all of the peripheral straps 80 may not have corresponding pockets 85, and the peripheral straps 80 in such an embodiment may have retraction straps 81 to pull the peripheral straps 80 on top of or underneath the device 20.

In one embodiment, each pocket 85 is configured to provide a padding and/or reinforcement structure, which helps to avoid bunching of the material of the sheet 15 during lifting, to avoid localized pressure points on the patient 11 when the straps 80 are in tension, and to avoid pressure points that may potentially be created by the peripheral strap 80 bunching up within the pocket 85. The padding structure may include multiple panels 86 of material, and may also include a padding material 88 included within the structure of the pocket 85, such as in the embodiment shown in FIG. 6. This embodiment includes padding material 88 on both the top and bottom sides of the pocket 85, sandwiched between multiple panels 86 of material. The padding material 88 as shown in FIG. 6 is provided as separate top and bottom pieces, although the padding material 88 could be provided as a single piece of material surrounding the pocket 85 or only on one side of the pocket 85. The padding material 88 in one embodiment may be flexible and soft to avoid creating stiff edges, but with some degree of rigidity and/or resiliency to provide reinforcement and structural stability. Such a material can provide support and padding to avoid localized pressure on the patient 11, as discussed above, as well as maintaining the structure and shape of the pockets 85 during use. The pockets 85 in the embodiment of FIGS. 1-8 have the padding material 88 located along the entire or substantially the entire length of the pocket 85. In this configuration, the padding material 88 on the two pockets 85 near the head edge 23 provide padding for the patient's shoulders, and the padding material 88 on the central pocket 85 provides support and padding for the back sides of the patient's legs. It is also understood that while a single piece/layer of the padding material 88 is shown on the top and bottom sides of the pocket 85, the padding material 88 may in reality be a multi-piece and/or multi-layered structure. It is also understood that the padding material 88 may be differently configured, based on the configurations of the peripheral straps 80 and the pockets 85 (if present).

Figure 10A:
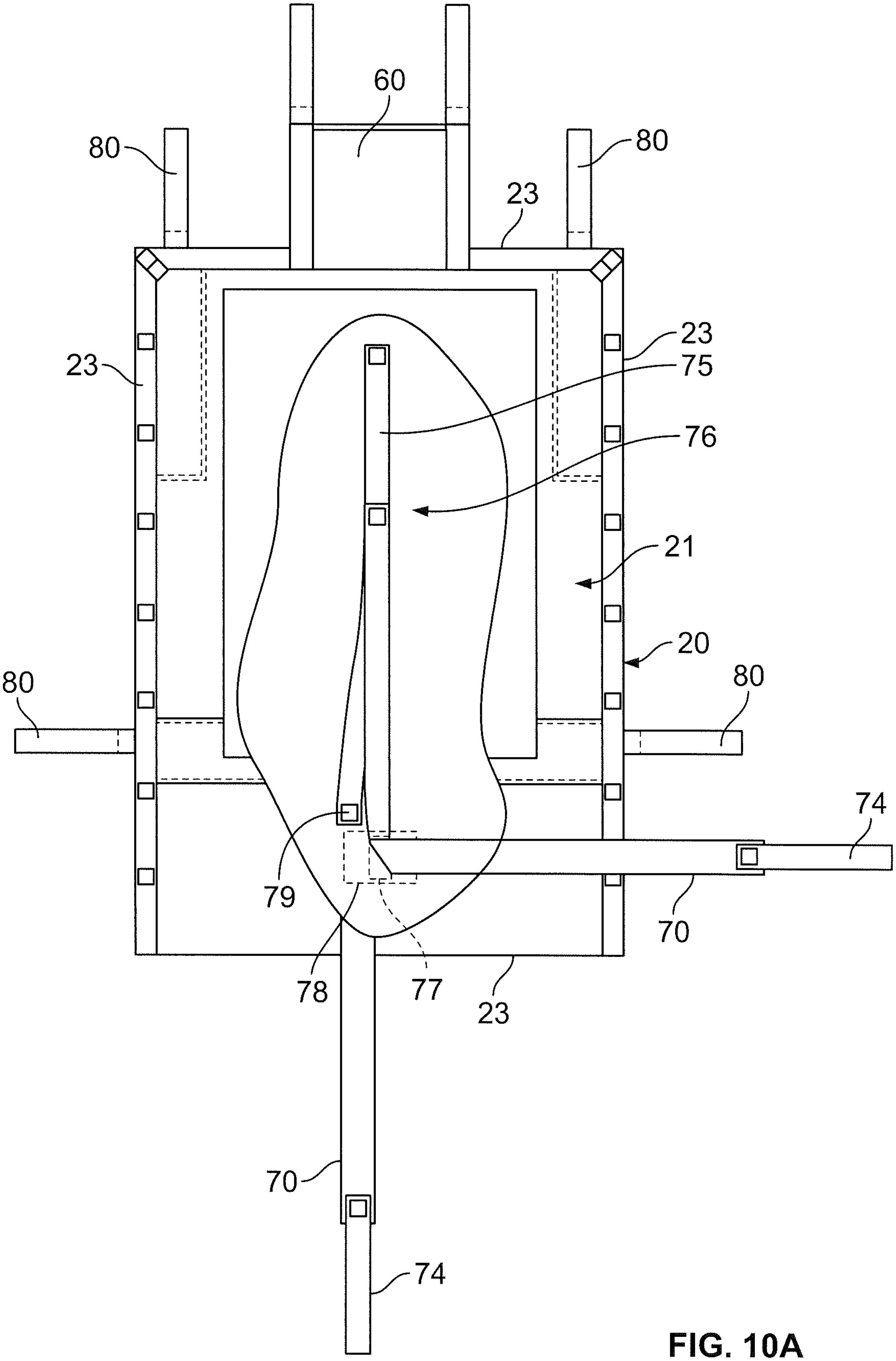
FIG. 10A is a partially-broken away top view of another embodiment of a system for use in turning and positioning a patient and a patient support device according to aspects of the disclosure, showing a central support strap in a retracted position.
Figure 10B:
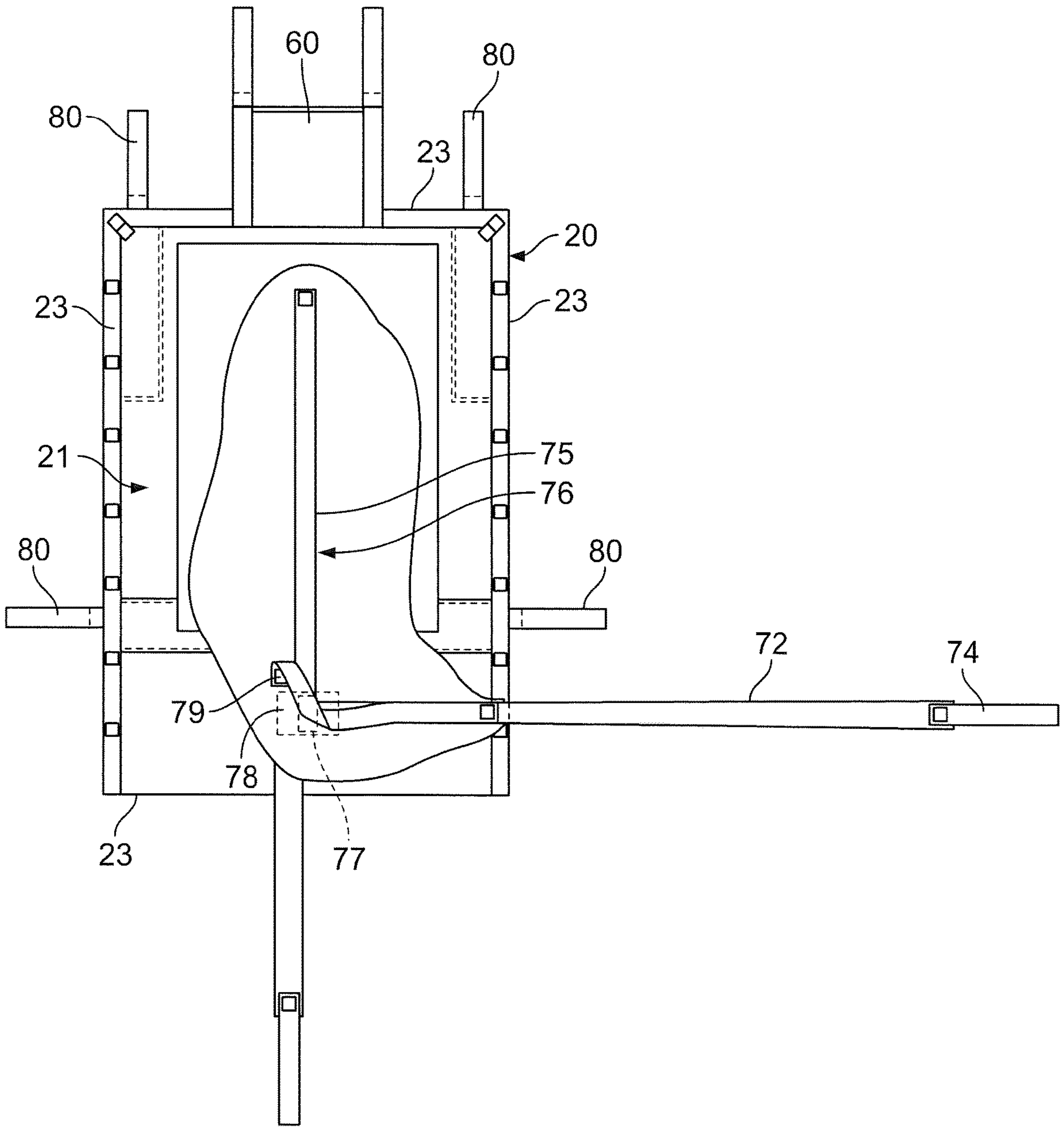
FIG. 10B is a partially-broken away top view of the device of FIG. 10, showing the central support strap in an extended position.

FIGS. 10A-B illustrate another embodiment of the device 20, where the central support straps 70 are retractable in a manner similar to the retraction of the peripheral straps 80 as described herein with respect to the embodiment of FIGS. 1-8. As shown in FIGS. 10A-B, each of the central support straps 70 has a retraction strap 75 that is connected to the device 20 (i.e., connected to the sheet 15) and connected to the central support strap 70. It is understood that FIGS. 10A-B are partially schematic, and that the retraction mechanism for only one of the central support straps 70 is illustrated in FIGS. 10A-B. When tension is exerted to extend the central support straps 70, the retraction straps 75 stretch to permit such extension, and when the tension is released, the retraction straps 75 pull the central support straps 70 toward the device 20, as similarly described herein with respect to the peripheral straps 80 and retraction straps 81. The central support straps 70 and the retraction straps 75 may be located inside a pocket 76 or pockets 76, as shown in FIGS. 10A-B, as also similarly described herein with respect to the pocket(s) 85. FIGS. 10A-B illustrate both central support straps and both retraction straps 75 being connected within a single pocket 76 that extends from an opening 77 in the top surface 21 of the device 20 toward the head edge 23 of the device 20. As shown in FIGS. 10A-B, the opening 77 is positioned at approximately the same location as the hole 72 in FIGS. 1-8, and the connection points 79 of the central support straps 70 are positioned near the opening 77, so that the central support straps 70 exert a supporting force on the device 20 in approximately the same location in both embodiments. The opening 77 may be reinforced by a reinforcing material 78, as also shown in FIGS. 10A-B. The pocket 76 may be configured similarly to the pockets 85 described herein, such as being formed by one or more panels 86 of material connected to the sheet 15 and/or having padding material 88 at least partially surrounding the pocket 76. The embodiment of the device 20 illustrated in FIGS. 10A-B may include any of the other features described herein with respect to the embodiment of FIGS. 1-8 or any other embodiment, including the head support 60, peripheral straps 80, high-friction top surface 21, selective gliding assemblies 41, and other features. Similarly, this embodiment may be utilized in the same or similar manner to the other embodiments described herein.

The body pad 40 is typically made from a different material than the device 20 and contains an absorbent material, along with possibly other materials as well. The pad 40 provides a resting surface for the patient and can absorb fluids that may be generated by the patient. The pad 40 may also be a low-lint pad for less risk of wound contamination, and is typically disposable and replaceable, such as when soiled. The top and bottom surfaces 42, 44 may have the same or different coefficients of friction. Additionally, the pad 40 illustrated in the embodiments of FIGS. 1-2 is approximately the same width and slightly shorter in length as the device 20, and both the device 20 and the pad 40 are approximately the same width as the bed 12 so that the edges 23 of the device 20 and the edges of the pad 40 are proximate the side edges of the bed 12, but may be a different size in other embodiments.

In one embodiment, the pad 40 may form an effective barrier to fluid passage on one side (e.g., the underside 44), to prevent the device 20 from being soiled and may also be breathable, to permit flow of air, heat, and moisture vapor away from the patient and lessen the risk of pressure ulcers (bed sores). The device 20 may also be breathable to perform the same function, as described above. A breathable device 20 used in conjunction with a breathable pad 40 can also benefit from use with a LAL bed 12 to allow air, heat, and moisture vapor to flow away from the patient more effectively and to enable creation of an optimal microclimate around the patient. The pad 40 may have differently configured top and bottom surfaces 42, 44 with the top surface 42 being configured for contact with the patient and the bottom surface 44 being configured for contact with the device 20.

In the embodiment illustrated in FIGS. 1-8, the top surface 21 of the device 20 has at least a portion formed of a high-friction or gripping material 24, and the bottom surface 22 has at least a portion formed of a low-friction material 25. For example, the high-friction material 24 may be or include a coating applied to the top surface 21, such as a spray coating. In the embodiment of FIGS. 1-8, the main body of the device 20 is formed of a sheet 15 with the coating of the high friction material 24 covering a portion of the top surface 21. In another embodiment, the high-friction material 24 may be in the form of one or more pieces of high-friction sheet material connected to the top surface 21 of the device 20 in a surface-to-surface, confronting relation to form a layered structure, in various embodiments. For example, the high friction material 24 may be a knitted material, which can enhance comfort, and may be made of polyester and/or another suitable material. The material 24 can then be treated with a high friction substance, such as a hot melt adhesive or appropriate plastic, which can be applied as a discontinuous coating to promote breathability. In a further embodiment, the high-friction material 24 may be formed by a treatment applied to the top surface 21 that increases the friction properties of the top surface 21 without adding a separate material, such as a texturing treatment or a treatment to change the surface energy of the top surface 21. It is noted that the high-friction material 24 may form or cover the entire top surface 21 of the device 20 in one embodiment, or may only form or cover a portion of the top surface 21 in another embodiment, e.g., the low-friction material 25 may form a portion of the top surface 21 with the edges of the high-friction material 24 being recessed from the edges 23 of the device 20. Similarly, the low-friction material 25 may form at least a portion of the bottom surface 22 of the device 20.

As described in greater detail below, the low-friction material 25 permits sliding of the device 20 in contact with the supporting surface 16 of the bed 12, which may include a fitted bed sheet or other sheet, and the high-friction material 24 provides increased resistance to slipping or sliding of the patient and/or the body pad 40 on which the patient may be lying in contact with the device 20. The low-friction material 25 may also have rip-stop properties, and may have suitable structural strength and stability to form the primary structural component of the device 20. In one embodiment, the sheet 15 forming the main body of the device 20 may be formed of polyester and/or nylon (polyamide), for example, a coated nylon taffeta material that is liquid repellant and/or impermeable and having little to no air permeability, while being permeable to moisture vapor. The high-friction and/or low-friction materials 24, 25 can also be treated with a water repellant, such as polytetrafluoroethylene (PTFE). In other embodiments, the high-friction and/or low-friction materials 24, 25 may include any combination of these components and may contain other components in addition to or instead of these components.

Generally, the high friction material 24 has a coefficient of friction that is higher than the coefficient of friction of the low friction material 25. In one embodiment, the coefficient of friction for the high friction material 24 is about 8-10 times higher than the coefficient of friction of the low friction material 25. In another embodiment, the coefficient of friction for the high friction material 24 is between 5 and 10 times higher, or at least 5 times higher, than the coefficient of friction of the low friction material 25. The coefficient of friction, as defined herein, can be measured as a direct proportion to the pull force necessary to move either of the materials 24, 25 in surface-to-surface contact with the same third material, with the same normal force loading. Thus, in the embodiments above, if the pull force for the high friction material 24 is about 8-10 times greater than the pull force for the low friction material 25, with the same contact material and normal loading, the coefficients of friction will also be 8-10 times different. It is understood that the coefficient of friction may vary by the direction of the pull force, and that the coefficient of friction measured may be measured in a single direction. For example, in one embodiment, the above differentials in the coefficients of friction of the high friction material 24 and the low friction material 25 may be measured as the coefficient of friction of the low friction material 25 based on a pull force normal to the side edges 23 (i.e. proximate the handles 28) and the coefficient of friction of the high friction material 24 based on a pull force normal to the head and foot edges 23 (i.e. parallel to the side edges 23).

Additionally, the coefficient of friction of the interface between the high-friction material 24 and the body pad 40 is greater than the coefficient of friction of the interface between the low friction material 25 and the bed sheet or supporting surface 16. It is understood that the coefficients of friction for the interfaces may also be measured in a directional orientation, as described above. In one embodiment, the coefficient of friction for the interface of the high friction material 24 is about 8-10 times higher than the coefficient of friction of the interface of the low friction material 25. In another embodiment, the coefficient of friction for the interface of the high friction material 24 is between 5 and 10 times higher, or at least 5 times higher, than the coefficient of friction of the interface of the low friction material 25. It is understood that the coefficient of friction for the interface could be modified to at least some degree by modifying factors other than the device 20. For example, a high-friction substance or surface treatment may be applied to the bottom surface 44 of the pad 40 to increase the coefficient of friction of the interface. An example of a calculation of the coefficients of friction for these interfaces is described in greater detail in U.S. Patent Application Publication No. 2012/0186012, published Jul. 26, 2012, which is incorporated by reference herein in its entirety and made part hereof, which calculation is made using a rip-stop nylon material as the low friction material 25 and a knitted material treated with a hot melt adhesive as the high friction material 24. The relative coefficients of friction of the high friction material 24 and the low friction material 25 used in the example calculation are also described in the aforementioned publication.

In an alternate embodiment, the device 20 may not utilize a high friction surface, but instead may utilize a releasable connection to secure the pad 40 in place with respect to the device 20. For example, the device 20 and pad 40 may include complementary connections, such as hook-and-loop connectors, buttons, snaps, or other connectors. In a further embodiment, the device 20 may be used without a pad 40, with the patient 11 directly in contact with the top surface 21 of the sheet 15, and the high-friction material 24 can still resist sliding of the patient on the device 20.

In one embodiment, as illustrated in FIGS. 1-8, the device 20 may also include one or more handles 28 to facilitate pulling, lifting, and moving the device 20. As shown in FIGS. 1-8, the device 20 has handles 28 formed by strips 29 of a strong material that are connected (e.g., stitched) in periodic fashion to the bottom surface 22 at or around both side edges 23 of the device 20, as well as the top or head edge 23 of the device. The non-connected portions can be separated slightly from the device 20 to allow a user's hands to slip underneath and thereby form the handles 28. The handles 28 formed by the strips 29 on the side edges 23 of the device 20 are useful for pulling the device 20 laterally to move the patient 11 laterally on the bed 12. The handles 28 may be useful for moving the device 20 and the patient 11 in many different ways, including pulling the device 20 laterally, turning the patient 11, and/or pulling the device 20 toward the head 13 of the bed 12 to "boost" the patient 11 and device 20 if they begin to slide toward the foot 17 of the bed 12, which may tend to happen especially when the patient 11 is inclined. In other embodiments, the device 20 may include a different number or configuration of the handles 28 as described above. Further, the handles 28 may be connected to the device 20 in a different way, such as by heat welding, sonic welding, adhesive, etc. Other types of handles may be utilized in further embodiments.

Figure 15:
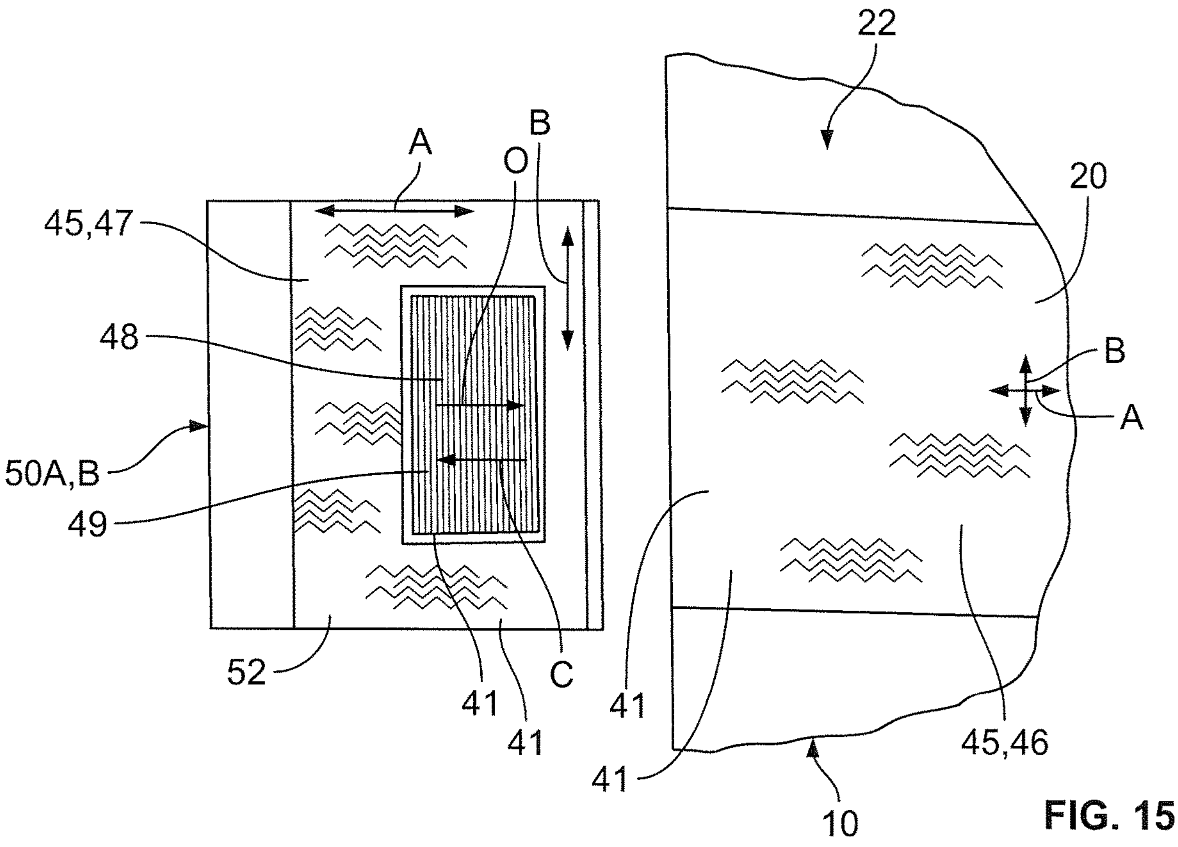
FIG. 15 is a schematic plan view of various selective glide assemblies of the system of FIG. 1, with arrows schematically illustrating directions of free movement and directions of resistance to movement between the components of the system.

In example embodiments described herein, the apparatus 10 has one or more selective gliding assemblies 41 positioned between components of the apparatus 10 to permit sliding of the components relative to each other in certain directions and to resist sliding of the components relative to each other in at least one direction. The selective gliding assemblies 41 are formed by one or more directionally-oriented engagement members positioned between the components and configured to engage the components to permit and limit sliding in specified directions. In general, these directionally-oriented engagement members are configured to have a resistance to sliding in at least one direction that is greater than their resistance to sliding in at least one other direction. In the embodiment shown in FIGS. 1-8, the device 20 has one or more engagement members 46 positioned on the bottom surface 22, which are configured to form one or more selective gliding assemblies 41, such as by engaging engagement members 47 and/or 48 on the wedge 50A-B, as shown in FIG. 15 and described in greater detail below. The device 20 as shown in FIGS. 1-8 has two engagement members 46 on the bottom surface 22, with one engagement member 46 positioned on the portion of the sheet 15 under the patient's upper body and the other positioned on the portion of the sheet 15 under the patient's lower body. In another embodiment, the device 20 may have a single, larger engagement member 46 or multiple engagement members 46, and the engagement member(s) 46 in such other embodiments may have different configurations.

Figure 16:
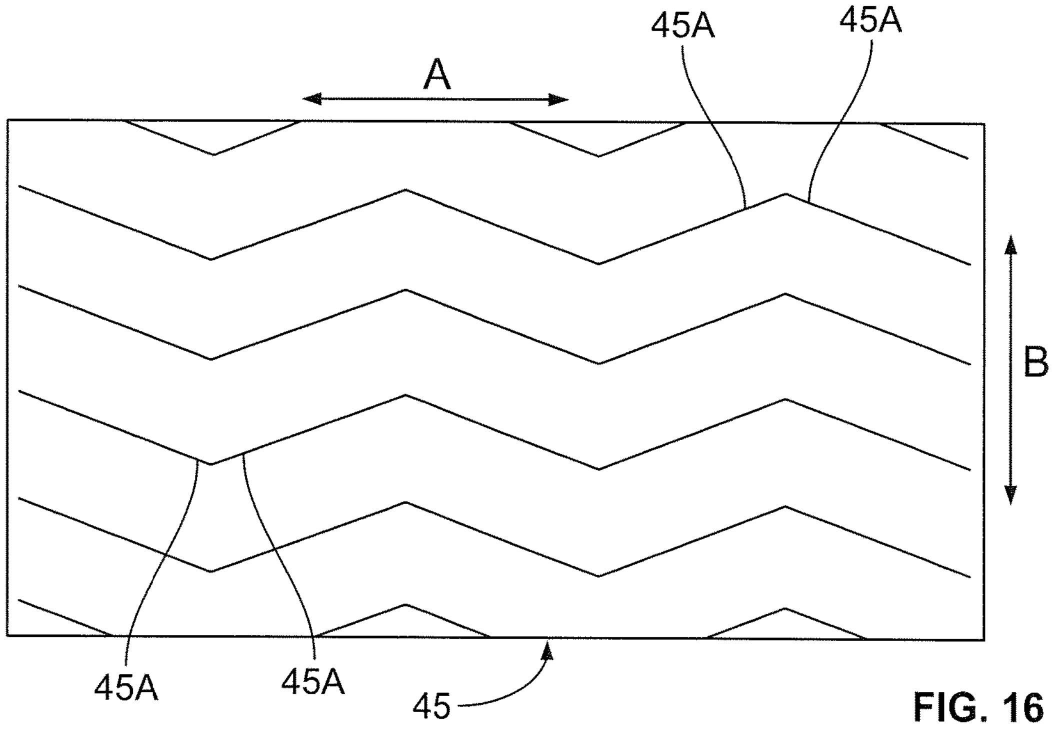
FIG. 16 is a schematic plan view of one engagement member of a selective glide assembly of the system of FIG. 1.
Figure 17:
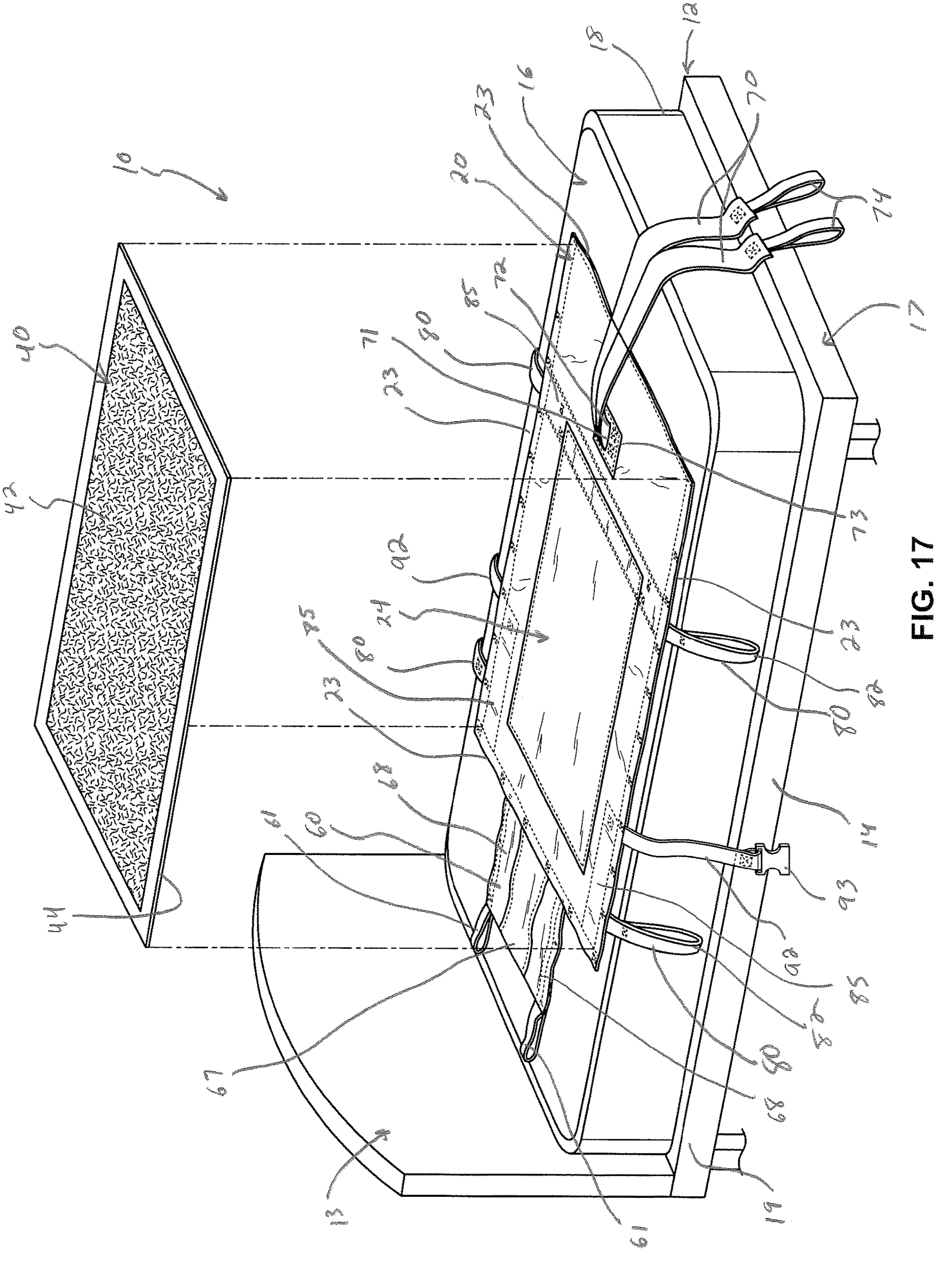
FIG. 17 is a partially-exploded perspective view of another embodiment of a system for use in turning and positioning a patient, including a patient support device, according to aspects of the disclosure.
Figure 18:
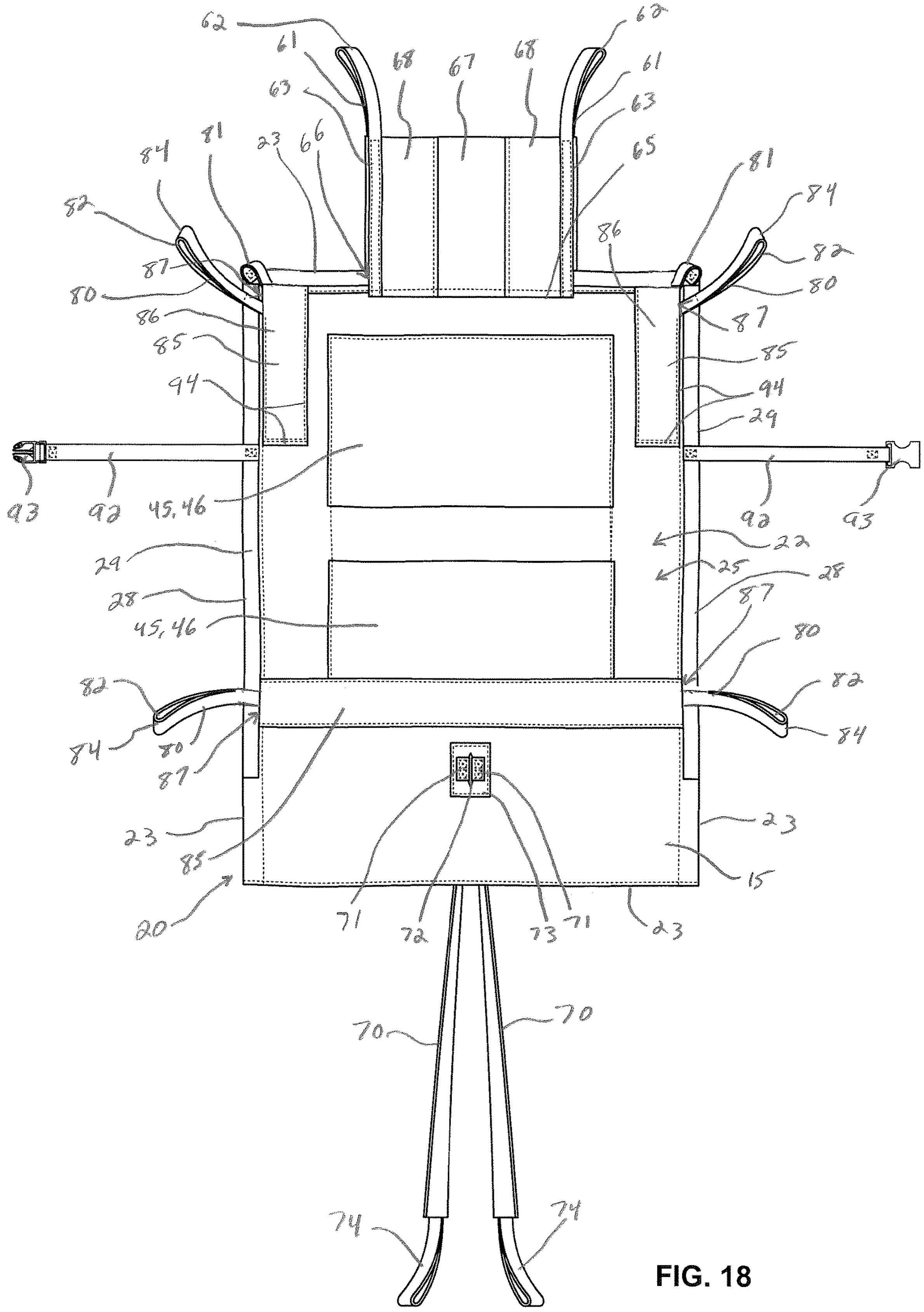
FIG. 18 is a bottom view of the system and device of FIG. 17.

One type of engagement member that is usable in connection with the apparatus 10 is a stitched material 45 with a directional stitching pattern that extends along a particular direction, such as a herringbone or zig-zag stitching pattern (see FIG. 16), to assist in allowing the engagement member to glide along one axis and to resist gliding along another axis. As seen in FIG. 16, the herringbone stitching pattern shown is relatively open, with links 45A forming angles of 90° or greater, such that each link 45A in the stitching pattern extends a greater distance along axis A than along axis B. In one embodiment, the links 45A may form angles of approximately 120°, approximately 110°-180° (straight line), or 90° or greater with respect to each other. Other directional stitching patterns may be utilized, including other directional stitching patterns with links 45A that are oriented and/or sized differently. In one example, the engagement member 47 may have stitching in the form of a plurality of parallel or substantially parallel lines extending generally a single direction. The directional stitching material 45 as shown in FIG. 16 permits sliding in directions generally along the axis A, or in other words, along the directions in which the stitching pattern extends. The directional stitching material 45 as shown in FIG. 16 resists sliding in directions generally along the axis B, or in other words, across the stitches and/or transverse to the directions in which the stitching pattern extends. The device in FIGS. 1-8 has two engagement members 46 on the bottom surface 22 that are made from a directional stitching material 45 as described herein. In other embodiments, the engagement member(s) 46 of the device 20 may be made from a different type of material.

One example of a stitched material usable as the directional stitching material 45 is a loop material (e.g. as used in a hook-and-loop connection) with a directional stitching pattern located on the reverse side of the loop material. This loop material may be connected to a component of the apparatus 10 with the loop side facing inward and the reverse side facing outward to form the surface of the engagement member. The directional stitching material 45 may be formed of a different material in another embodiment, including, without limitation, a variety of different fabric materials. It is understood that such materials may include a directional stitching pattern. The directional stitching material 45 may be connected to a component of the apparatus in a surface-to-surface, confronting relation to form a layered structure in one embodiment, such as by stitching, adhesive, sonic welding, heat welding, and/or other techniques, including techniques familiar to those skilled in the art.

As used in some embodiments described herein, two pieces of a directional stitching material 45, such as shown in FIG. 16, can be used in engagement with each other, with the axes A and B of the stitching patterns of the two pieces in alignment, to provide increased resistance to sliding along the axis B. The two pieces of directional stitching material 45 may be the same type of material or different types of material in various embodiments, and may have the same or different stitching patterns. This directional stitching material 45 may also be used in connection with other directionally-oriented engagement members to achieve increased resistance to sliding in selected directions. In various uses, the directional stitching material 45 may have a directional stitching pattern that extends primarily in the lateral or width direction of the apparatus 10 (i.e. between side edges 23) or primarily in the longitudinal or length direction of the apparatus 10 (i.e. between the head edge 23 and foot edge 23).

Other materials having directionally oriented textures, patterns, etc., extending in a specified direction may be usable in connection with the apparatus 10 as engagement members. For example, such a material may have a ridged or other textured structure. The directionally oriented texture may have a shape and/or orientation that is similar to one of the embodiments of the directional stitching patterns described above. Such a textured structure may be created by various techniques, including weaving, texturing (e.g. physical deformation), or application of a substance such as by printing, deposition, etc., among other techniques. Such other materials may function in the same manner as the directional stitching material 45 discussed above.

Another type of engagement member that is usable in connection with the apparatus 10 is a directional glide material, such as a brushed fiber material or other brushed fabric material, which may have fibers that lie facing a specific direction. In general, a directional glide material resists gliding in a single direction and permits relatively free gliding in the opposite direction and along an axis perpendicular to the single direction of resistance, such that the resistance to gliding in the single direction is significantly higher than any of these three other directions identified. Additionally, a directional glide material may have structural characteristics to create this resistance and freedom for gliding in specific directions, such as structural elements that are directionally oriented. For example, the directional glide material may include projecting structures, e.g., ridges, fibers, bristles, etc., that extend non-perpendicularly from the surface of a substrate, a majority or substantial entirety of which are oriented (e.g., angled, curved, etc.) in the same general direction. One embodiment of an engagement member made of a directional glide material may be a brushed nylon fiber material (e.g. lint brush material) with about 44-48 wales per inch and about 54-58 courses per inch in one embodiment. Another type of directional glide material may be used in other embodiments, including various ridged fabric and non-fabric materials, such as a flexible ratchet material as used in a zip-tie. The directional glide material may be connected to a component of the apparatus in a surface-to-surface, confronting relation to form a layered structure in one embodiment, such as by stitching, adhesive, sonic welding, heat welding and other techniques, including techniques familiar to those skilled in the art. This directional glide material can be used in connection with a directional stitching material 45 as shown in FIG. 16 to create a selective gliding assembly 41 with a "one-way" glide arrangement. This can be done by engaging the directional glide material with the directional stitching material, with the single direction of resistance of the directional glide material being aligned with the axis along which the stitching pattern extends. This arrangement allows the engagement members to glide with the grain of the directional glide material while resisting gliding in other directions, including the opposite direction along the same axis as the gliding direction (i.e., along one of directions A in FIGS. 15-16).

As described herein with respect to the embodiment of FIGS. 1-8, the system may use selective gliding assemblies 41 to create directional gliding between the wedges 50 and the underside of the device 20 and/or between the wedges 50 and the bed 12. These selective gliding assemblies 41 may include one or more pieces of directional stitching material 45 and/or one or more pieces of directional glide material 49, as illustrated schematically in FIG. 15 and described in greater detail elsewhere herein. In other embodiments, selective gliding assemblies 41 may be used to create directional gliding between one or more of the above sets of components and/or between one or more other components of the system 10.

In one embodiment, the device 20 has a directional stitching material 45 connected to the bottom surface 22, which may be in the form of one or more additional pieces of sheet material that is formed partially or entirely of the directional stitching material 45. Additionally, the one or more additional pieces of the directional stitching material 45 may form at least a portion of the bottom surface 22 of the device 20, with the edges of each piece being recessed from the edges 23 of the device 20, and with the pieces of the directional stitching material 45 being spaced from each other.

The directional stitching material 45 on the bottom surface 22 of the device 20 in the embodiment of FIGS. 1-8 forms engagement members 46 of a selective gliding assembly 41 (which may be referred to as "sheet engagement members"), as described above, to permit movement of the device 20 in desired directions and resist movement of the device 20 in undesired directions. In the embodiment of FIGS. 1-8, the axis B (along which gliding is resisted) is oriented to extend between the top and bottom edges 23 and parallel to the side edges 23, and the axis A (along which gliding is allowed) is oriented to extend between the side edges 23 and parallel to the head and foot edges 23. When the wedge(s) 50A-B are inserted in position as shown in FIG. 3, then relative to the wedge(s) 50A-B, the axis B is oriented to extend parallel to at least one of the apex 55 and the back wall 53 of the wedge and/or between the side walls 54, and the axis A is oriented to extend between the apex and the back wall of the wedge and/or parallel to the side walls 54. This arrangement is illustrated schematically in FIG. 15. In a further embodiment, one or more of the engagement members 46 may be formed of a different directionally-oriented material, and/or may be oriented to allow/resist gliding in different directions. For example, if the orientations of the engagement members 46 as depicted in FIG. 15 are turned 90°, then movement in a direction extending between the side edges 23 and parallel to the head and foot edges 23 would be resisted, and movement in a direction extending between the head and foot edges 23 and parallel to the side edges 23 would be allowed.

Figure 13:
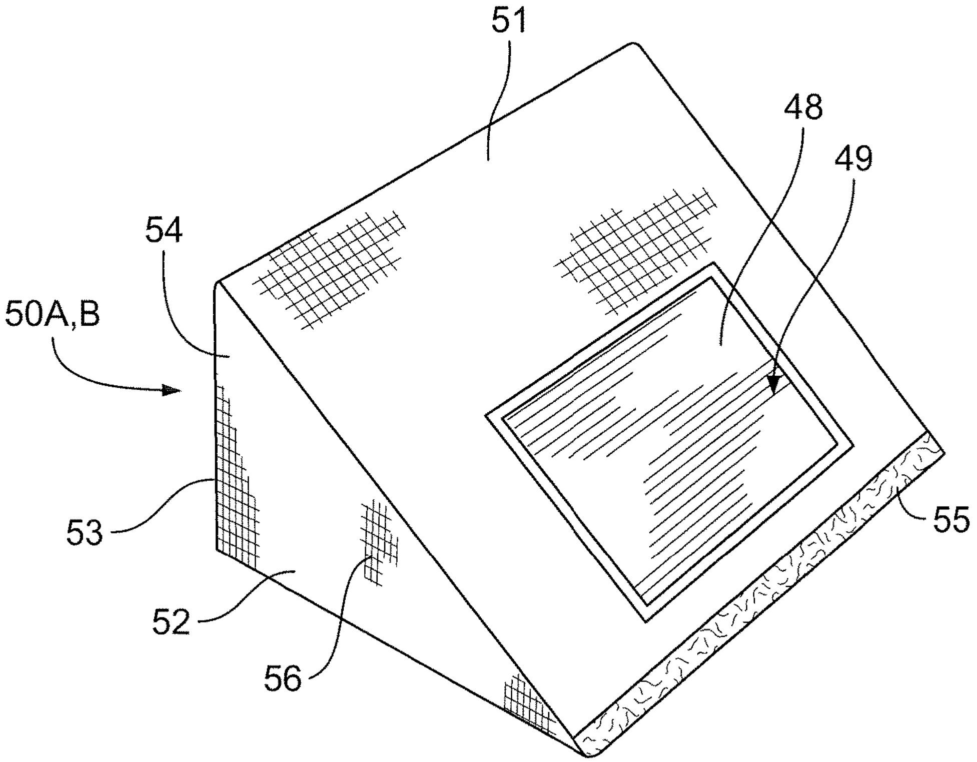
FIG. 13 is a bottom perspective view of a wedge of the system of FIG. 1.
Figure 14:
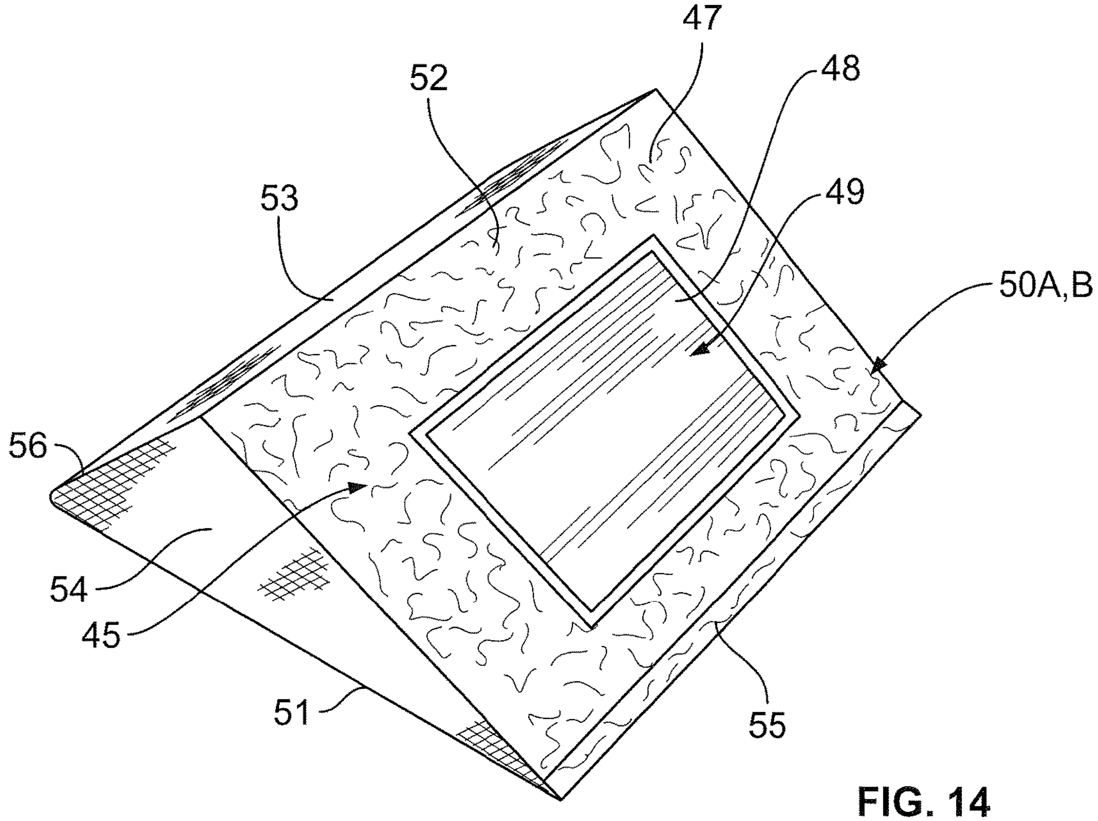
FIG. 14 is a top perspective view of the wedge of FIG. 13.

The system 10 may include one or more wedges 50A-B that can be positioned under the device 20 to provide a ramp and support to slide and position the patient slightly on his/her side, as described below. FIGS. 13-14 illustrate example embodiments of wedges 50A-B that can be used in conjunction with the system 10. The wedge 50A-B has a body 56 that can be triangular in shape, having a base wall or base surface 51, a ramp surface 52 that is positioned at an oblique angle to the base wall 51, a back wall 53, and side walls 54. In this embodiment, the base wall 51 and the ramp surface 52 meet at an oblique angle to form an apex 55, and the back wall 53 is positioned opposite the apex 55 and approximately perpendicular to the ramp surface 52. The apex 55 may be the smallest angle of any of the corners of the wedge 50A-B, in one embodiment. It is understood that the term "apex" does not necessarily imply that the surfaces (e.g., the base wall 51 and the ramp surface 52) directly join to form a point or an angular edge, and that the "apex" as described herein may be rounded, beveled, flattened, etc. The side walls 54 in this embodiment are triangular in shape and join at approximately perpendicular angles to the base wall 51, the ramp surface 52, and the back wall 53. In this embodiment, the surfaces 51, 52, 53, 54 of the wedge body 56 are all approximately planar when not subjected to stress, but in other embodiments, one or more of the surfaces 51, 52, 53, 54 may be curved or rounded. Any of the edges between the surfaces 51, 52, 53, 54 of the wedge body 56 may likewise be curved or rounded, including the apex 55.

The wedge body 56 in this embodiment is at least somewhat compressible or deformable, to provide greater patient comfort and ease of use. Any appropriate compressible material may be used for the wedge body 56, including various polymer foam materials, such as a polyethylene and/or polyether foam. A particular compressible material may be selected for its specific firmness and/or compressibility, and in one embodiment, the wedge body 56 is made of a foam that has relatively uniform compressibility.

The wedge 50A-B is configured to be positioned under the device 20 and the patient to position the patient at an angle, as described in greater detail below. In this position, the base wall 51 of the wedge 50A-B faces downward and engages or confronts the supporting surface 16 of the bed 12, and the ramp surface 52 faces toward the device 20 and the patient and partially supports at least a portion of the weight of the patient. The angle of the apex 55 between the base wall 51 and the ramp surface 52 influences the angle at which the patient is positioned when the wedge 50A-B is used. In one embodiment, the angle between the base wall 51 and the ramp surface 52 may be up to 45°, or between 15° and 35° in another embodiment, or about 30° in a further embodiment. Positioning a patient at an angle of approximately 30° is currently clinically recommended, and thus, a wedge 50A-B having an angle of approximately 30° may be the most effective for use in positioning most immobile patients. If clinical recommendations change, then a wedge 50A-B having a different angle may be considered to be the most effective. The wedge 50A-B may be constructed with a different angle as desired in other embodiments. It is understood that the device 20 may be usable without the wedges 50A-B or with another type of wedge, including any commercially available wedges, or with pillows in a traditional manner. For example, the device 20 may be usable with a single wedge 50A-B having a greater length, or a number of smaller wedges 50A-B, rather than two wedges 50A-B, in one embodiment. As another example, two wedges 50A-B may be connected together by a narrow bridge section or similar structure in another embodiment. It is also understood that the wedge(s) 50A-B may have utility for positioning a patient independently and apart from the device 20 or other components of the system 10 and may be used in different positions and locations than those described and illustrated herein.

In one embodiment, the wedges 50A-B may have a directionally-oriented material (e.g., a directional stitching material 45, directional glide material, etc.) covering at least a portion of the ramp surface 52 and potentially other surfaces as well. In the embodiments illustrated in FIGS. 13-14, the wedges 50A-B have the directional stitching material 45 covering the ramp surface 52. In another embodiment, the directional stitching material 45 may additionally or alternately cover the base wall 51, the back wall 53, and/or the side walls 54. The directional stitching material 45 in this embodiment forms an engagement member 47 (which may be referred to as a "ramp engagement member") of a selective gliding assembly 41 on the ramp surface 52. In this embodiment, the directional stitching material 45 on the ramp surface 52 has the axis B (along which gliding is resisted) extending between the side walls 54 and parallel to the apex edge 55, as illustrated in FIG. 15. Accordingly, the axis A (along which gliding is allowed) extends perpendicular to the apex edge 55 and parallel to the side walls 54 in this embodiment, as illustrated in FIG. 15. In this arrangement, the directional stitching material 45 resists movement of the wedges 50A-B in directions parallel to the ramp surface 52 and perpendicular to the side walls 54, as described in greater detail herein. Similarly, the directional stitching material 45 resists movement of another surface in contact with the directional stitching material 45 (e.g., the bottom surface 22 of the device 20) relative to the wedges 50A-B in directions along the ramp surface 52 (i.e., parallel to the apex 55 and/or the back wall 51) and perpendicular to the side walls 54. The directional stitching material 45 also engages the engagement members 46 of the directional stitching material 45 on the bottom surface 22 of the device 20 to enhance the selective gliding effect of the selective gliding assembly. This arrangement is illustrated schematically in FIG. 15. The other surfaces (e.g., the base wall 51, the back wall 53, and the side walls 54) of the wedges 50A-B are covered by a wrapping material 43 in the embodiment of FIGS. 13-14. This wrapping material 43 may be a taffeta fabric or other suitable material. In another embodiment, one or more of these surfaces may not be covered by any material, so that the inner material of the wedges 50A-B is exposed, or one or more of these surfaces may be partially covered by a material.

In the embodiments illustrated in FIGS. 13-14, the wedges 50A-B also have engagement members 48 in the form of patches of a directional glide material 49 located on one or more surfaces. The wedges 50A-B illustrated in FIGS. 13-14 have engagement members 48 of the directional glide material 49 located on the ramp surface 52 and the base wall 51 (which may also be referred to as a "ramp engagement member" and a "base engagement member," respectively). In another embodiment, one of the wedges 50B may have an engagement member 48 of the directional glide material 49 located on the ramp surface 52, but not on the base wall 51. Each of the engagement members 48 in this embodiment have the directional glide material 49 oriented so that the direction C of allowed movement of another surface with respect to the base wall 51 or the ramp surface 52 extends from the apex 55 toward the back wall 53, as illustrated in FIG. 15. For example, for a brushed nylon fiber material, the fibers would be angled toward the back wall 53 so that gliding over the engagement member 48 in the direction C from the apex 55 toward the back wall 53 is free, while gliding in the opposite direction D from the back wall 53 toward the apex 55 is resisted. It is understood that this gliding is explained above with respect to the movement of another surface in contact with the directional glide material 49 (e.g., the bottom surface 22 of the device 20 or the bed sheet) relative to the wedge 50A-B. This same directional relationship can alternately be expressed as resisting movement of the wedge 50A-B with respect to the other surface in a direction from the apex 55 toward the back wall 53 (e.g., resisting the wedge 50A-B from moving away from the patient) while allowing free gliding of the wedge 50A-B with respect to the other surface in a direction from the back wall 53 toward the apex 55 (e.g., allowing easy insertion of the wedge 50A-B beneath the device 20).

In the embodiments illustrated in FIGS. 13-14, the patches of the directional glide material 49 cover only a portion of the surfaces 51, 52 on which they are located, such that the edges of the directional glide material 49 are spaced from the edges of the respective surfaces on which they are located. In this configuration, the amount of the directional glide material 49 is sufficient to provide good resistance to unwanted slipping, but is not excessively expensive and leaves part of the directional stitching material 45 on the ramp surface 52 exposed to provide further functionality. For example, in one embodiment, the directional glide material 49 may cover approximately 20-40% of the surface area of the respective surface on which it is disposed, and in another embodiment, the directional glide material 49 may cover approximately 25-30% of the respective surface. In other embodiments, the directional glide material 49 may be located, sized, and/or oriented differently, and generally cover at least a portion of the surfaces on which they are located. Additionally, each of the patches of the directional glide material 49 may have a border to help resist abrasion, fraying, and/or other wear, as shown in FIGS. 13-14. Such a border may be created by stitching (e.g., serge stitch), addition of a durable material, and/or other techniques. Further, each of the patches of the directional glide material 49 may be connected to the wedge 50A-B by stitching, adhesive or other bonding, and/or other techniques. The engagement members 48 may have other configurations in other embodiments, including using different types of directionally-oriented materials.

As described above, the engagement members 47 of the directional stitching material 45 on the ramp surfaces 52 of the wedges 50A-B engage the engagement members 46 of the directional stitching material 45 on the bottom surface 22 of the device 20 to enhance the selective gliding effect of the selective gliding assembly 41, as illustrated schematically in FIG. 15. This engagement resists movement of the device 20 with respect to the wedges 50A-B along the axis B, and particularly in the direction from the top or head edge 23 to the bottom or foot edge 23 of the device 20, or in other words, from the head 13 to the foot 17 of the bed 12. In one embodiment, the directional stitching material 45 sliding upon another piece of the same material provides a resistance to sliding along the axis B on both pieces of material that is at least 3× greater (e.g., 3.6× in one embodiment) than the resistance to sliding along the axis A on both pieces of material. In other embodiments, the directional stitching material 45 sliding upon another piece of the same material provides a resistance to sliding along the axis B on both pieces of material that is at least 2× greater, or at least 2.5× greater, than the resistance to sliding along the axis A on both pieces of material. These and all other relative measurements of resistance to sliding described herein may be calculated using ASTM D1894. Additionally, the engagement members 48 of the directional glide material 49 engage the engagement members 46 of the directional stitching material 45 on the bottom surface 22 of the device 20 to resist movement of the device 20 with respect to the wedges opposite to the direction C, from the back wall 53 toward the apex 55 of the wedges 50A-B, or in other words, to resist sliding of the device 20 down the slope of the ramp surface 52. In one embodiment, the directional stitching material 45 sliding upon the directional glide material 49 along the axis A of the material 45 and in the direction D of the material 49 provides a resistance to sliding that is at least 3× greater (e.g., 3.5× in one embodiment) than the resistance to sliding along the axis A and in the direction C. In another embodiment, the directional stitching material 45 sliding upon the directional glide material 49 along the axis A of the material 45 and in the direction D of the material 49 provides a resistance to sliding that is at least 2× greater, or at least 2.5× greater, than the resistance to sliding along the axis A and in the direction C. Additionally, in one embodiment, the directional stitching material 45 sliding upon the directional glide material 49 along the axis B of the material 45 (perpendicular to the directions C and D of the material 49) provides a resistance to sliding that is at least 3.5× greater (e.g., 4.1× in one embodiment) than the resistance to sliding along the axis A and in the direction C. In another embodiment, the directional stitching material 45 sliding upon the directional glide material 49 along the axis B of the material 45 (perpendicular to the directions C and D of the material 49) provides a resistance to sliding that is at least 2× greater, at least 2.5× greater, or at least 3× greater, than the resistance to sliding along the axis A and in the direction C.

The combination of these engagements between the engagement members 46, 47, 48 creates a selective gliding assembly 41 with a "one-way" gliding arrangement between the device 20 and the wedges 50A-B, where the device 20 can only freely move in the direction C toward the back walls 53 of the wedges 50A-B, as shown in FIG. 15, which allows the device 20 and the patient 11 to be pulled up onto the ramp surfaces 52 of the wedges 50A-B without resistance, as described herein. The engagement member 48 of the directional glide material 49 on the base wall 51 of the wedge 50A-B also resists sliding of the wedge 50A-B away from the apex 55, or in other words, resists sliding of the wedge 50A-B out from underneath the device 20. In one embodiment, the directional glide material 49 sliding against a typical bed sheet material in the direction D provides a resistance to sliding that is at least 2.5× greater (e.g., 2.9× in one embodiment) than the resistance to sliding in the direction C. Additionally, in one embodiment, the directional glide material 49 sliding against a typical bed sheet material perpendicular to the directions C and D (i.e. toward the foot 17 of the bed 12) also provides a resistance to sliding that is at least 2.5× greater (e.g., 2.5× in one embodiment) than the resistance to sliding in the direction C. The base walls 51 of the wedges 50A-B may also include a material or feature to offer some resistance to sliding of the wedges 50A-B along the axis B in one embodiment, and particularly in the direction from the top edge 23 to the bottom edge 23 of the device 20, or in other words, from the head 13 to the foot 17 of the bed 12. For example, a directional stitching material 45 or another directionally-oriented material may be used for this purpose. The resistance to sliding provided by such material may be less than the resistance of the selective gliding assemblies 41 between the device 20 and the ramp surfaces 52 of the wedges 50A-B such that the device 20 will not be encouraged to slide relative to the wedges 50A-B, and the device 20, the pad 40, the wedges 50A-B, and the patient 11 may move together without slipping relative to one another.

As described herein, the selective gliding assemblies 41 can resist movement in one or more directions and allow free movement in one or more different directions, which may be transverse or opposed to each other. It is understood that the "resistance" to sliding may be expressed using a difference in pull force necessary to create sliding movement between the same pieces of material in different directions. For example, if a selective gliding assembly is considered to "resist" sliding in one direction and "allow" sliding in another direction, this may be determined by having a relatively greater pull force necessary to create sliding movement between two engaging materials in the former direction and a relatively smaller pull force necessary to create sliding movement between the same two materials in the latter direction. The difference in resistance may be expressed quantitatively as well, such as described elsewhere herein. In one embodiment, a selective gliding assembly 41 may resist movement in one direction and may allow movement in another direction that is opposed (i.e., angled 180° to) the first direction. In another embodiment, a selective gliding assembly 41 may resist movement in one direction and may allow movement in another direction angled 90° to the first direction. In a further embodiment, a selective gliding assembly 41 may allow movement in one direction and may resist movement in at least two other directions angled 90° and 180° to the first direction. Still further types of directional gliding assemblies 41 may be constructed using materials as described herein and/or additional materials with directional properties.

In other embodiments, the apparatus 10 may include a different type of supporting device other than the wedges 50A-B illustrated in FIGS. 13-14, such as a different type or configuration of wedge or a different type of supporting device. For example, the wedges 50A-B may be joined together to form a single wedge in one embodiment, which may include a gap or cut-out at the sacral area. As another example, the system 10 may include a supporting device in the form of a pillow or cushion. It is understood that any supporting device for turning patients 11 that may be included with the system 10 may include any of the features of the wedges 50A-B described herein, including the engagement members 47, 48 for forming selective glide assemblies 41.

FIGS. 17-20 illustrate another embodiment of a patient support device 20 for use in connection with a system or apparatus 10 as described above. It is understood that the device 20 in FIGS. 17-20 may be used in connection with the wedges 50A-B, the absorbent body pad 40, and other components of the system 10 as described elsewhere herein, and the use of the device 20 of FIGS. 17-20 in connection with these other components is not illustrated or described in detail herein for the sake of brevity. Additionally, the device 20 of FIGS. 17-20 includes many components and features that are similar or identical to the components and features of the device 20 described herein with respect to other embodiments, e.g., the embodiment in FIGS. 1-8. Such similar or identical components are referred to using similar reference numbers and may not be described again in detail with respect to FIGS. 17-20, for the sake of brevity. In general, the device 20 in FIGS. 17-20 is described with respect to the differences from the embodiment of FIGS. 1-8, and the features shown in FIGS. 17-20 may be considered to be the same as the corresponding features in FIGS. 1-8 unless shown or described differently. It is understood that the device 20 in FIGS. 17-20 may include any of the components, features, or variations thereof described elsewhere herein with respect to other embodiments, and that other embodiments described herein may include one or more features of the device 20 in FIGS. 17-20, where there is no structural or functional conflict by doing such a combination.

Figure 19:
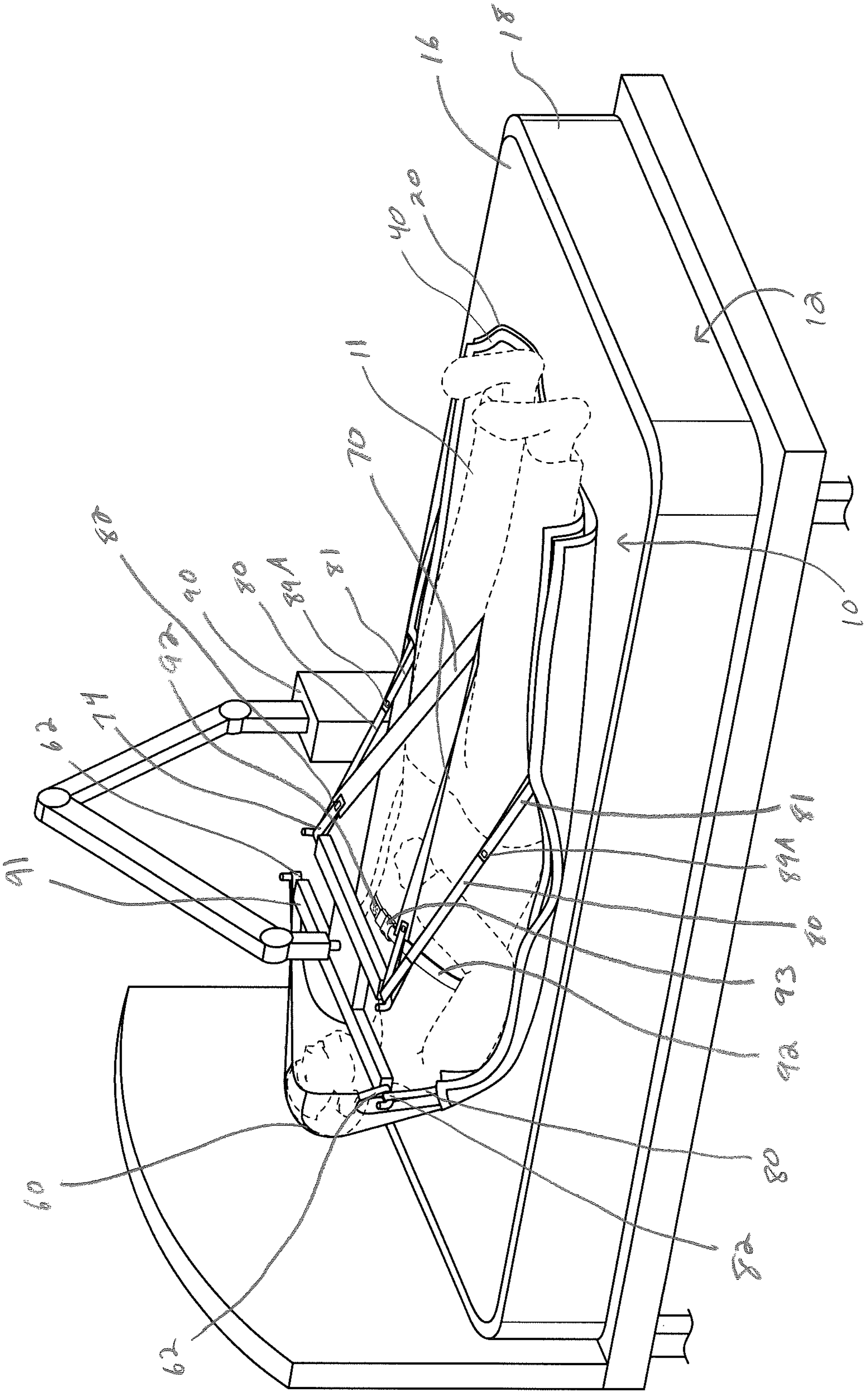
FIG. 19 is a perspective view of the system and device of FIG. 1, with a patient supported by the device shown in broken lines, and a hoist in position to lift the device.

The device 20 in the embodiment of FIGS. 17-20 has one or more safety straps 92 that are configured to fasten around the patient 11 when the device 20 is being used to lift the patient 11. The device 20 in FIGS. 17-20 has two safety straps 92 that are fixedly connected to the bottom surface 22 of the device 20 near the side edges 23, and extend outwardly from the side edges 23. In another embodiment, the safety strap(s) 92 may be connected in different locations on the device 20, such as the top surface 21 and/or farther from the edges 23; however, connecting the safety straps 92 on the bottom surface may have the added benefit of pulling the side edges 23 inwardly toward the patient 11 when the safety straps 92 are connected, thereby increasing stability. The safety strap(s) 92 may be made from a strong, relatively inelastic material (e.g., nylon), and may be made from the same material as the peripheral straps 80. In one embodiment, the safety straps 92 are configured to wrap around the patient 11 and releasably fasten or otherwise connect to each other. The safety straps 92 may have complementary releasable connection mechanisms 93, such as a releasable clasp or buckle 93 as shown in FIGS. 17-20. One or both of the safety straps 92 in this embodiment may be adjustable in length, such as by having a length adjustment mechanism incorporated into the clasp or buckle 93, or a separate length adjustment mechanism. In other embodiments, other releasable connecting structures may be used, including without limitation snaps, buttons, ties, hook-and-loop materials, other types of clasps/buckles, and other structures. In a further embodiment, the device 20 may include a single safety strap 92 which may, for example, be fixedly connected to the device 20 near one side edge 23 and may wrap around the patient 11 and releasably connect to the device 20 near the other side edge 23, or multiple such straps 92. In yet another embodiment, the device 20 may include more than two safety straps 92. In an additional embodiment, the safety strap(s) 92 may include a retractable configuration similar to the configuration of the peripheral straps 80. FIG. 19 illustrates the safety straps 92 connected around the torso of the patient 11, underneath the patient's arms, as the device 20 is configured to be lifted, but it is understood that the safety straps 92 may be connected over the patient's arms as well. The use of the safety straps 92 can reduce the risk that the patient 11 will fall off of the device 20 during lifting. This, in turn, may enable the use of a device 20 having a smaller lateral width, and it is noted that the device 20 in FIGS. 17-20 has a smaller lateral width than the device 20 in FIGS. 1-8. In use, the safety straps 92 may remain disconnected until the device 20 is to be lifted, at which point, the safety straps 92 are connected around the patient 11. The safety straps 92 may then be disconnected again after the device 20 is lowered and the lifting is complete.

The device 20 in the embodiment of FIGS. 17-20 has pockets 85 that are generally configured with the same structure and functionality as the pockets 85 described above with respect to FIGS. 1-8. Each pocket 85 in this embodiment has a plurality of enclosed boundaries 94 and an opening 87 proximate the edge 23 from which the respective peripheral strap 80 is configured to extend. The openings 87 are exposed on the bottom side 22 of the device 20 and are retracted slightly from the edges 23 of the sheet 15 in the embodiment of FIGS. 17-20, similar to the configuration in FIGS. 1-8. In the embodiment of FIGS. 17-20, the openings 87 of the pockets 85 near the head edge 23 extend along the end of the pocket 85 and partially along the outer boundary 94 (i.e., the boundary 94 closest to the side edge 23). Structurally, this creates a configuration where the inner boundary 94 (i.e., farthest from the side edge 23) is enclosed over a greater length than the outer boundary 94, thus creating an enlarged opening 87. In one embodiment, this difference in length is approximately 3 inches, or in other words, the outer boundary 94 of each pocket 85 is enclosed to a point that is approximately 3 inches from the boundary 94 most proximate the head edge 23 of the device 20. This enlarged opening 87 configuration enables a wider range of motion of the peripheral straps 80 when extended, as well as eases retraction of the peripheral straps 80 by reducing friction or snagging of the straps 80 on the edges of the opening 87, similar to the function of the flared openings 87 described above.

Figure 20:
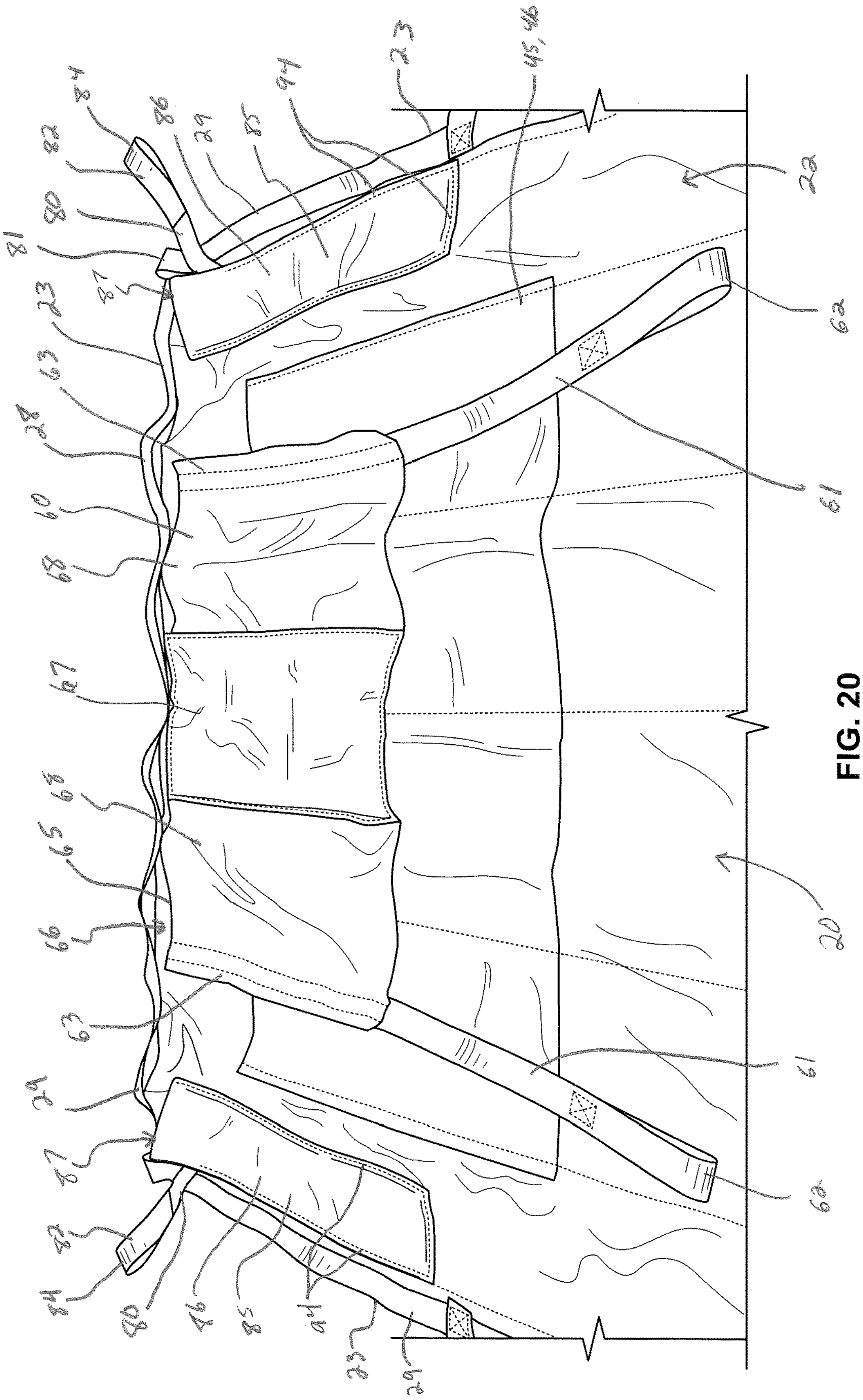
FIG. 20 is a bottom view of a portion of the system and device of FIG. 17.

The device 20 in the embodiment of FIGS. 17-20 also has a head support 60 near the head edge 23 that is configured to support the head of the patient 11 when the device 20 is lifted, and includes head support straps 61. The head support 60 in this embodiment is similar to the head support 60 in FIGS. 1-8, with some notable differences. The head support 60 in the embodiment of FIGS. 17-20 is connected to the device 20 at or proximate to the head edge 23 and extends outwardly from the head edge 23. In this embodiment, the head support 60 has a fixed end that is connected to the bottom surface 22 of the device 20 at a connection line 65 that is spaced inwardly from the head edge 23, such that a space 66 is defined between the connection line 65 of the head support 60 and the head edge 23 of the device 20. As referred to herein, the connection line 65 defines the boundary between the portion of the head support 60 that is fixed to the device 20 and the portion of the head support 60 that is free, and it is understood that additional portions of the head support 60 may be fixed on the opposite side of the connection line 65 from the free portion of the head support 60. The use of the term "line" does not necessarily imply that the connection is straight linear, and the connection line 65 may have curved and/or angular portions. As shown in FIG. 20, the connection line 65 this embodiment is located completely inward of the strip 29 forming the handles 28, so that the handles 28 can be accessed beneath the head support 60. Additionally, the connection line 65 in the embodiment of FIGS. 17-20 extends laterally, i.e., between the side edges 23 and generally parallel to the head edge 23, and is formed by continuous or intermittent stitching, as also shown in FIG. 20. This structure may be created by stitching a portion of the material of the head support 60 beneath the hem at the head edge 23 of the device 20 and/or beneath the strip 29 at the head edge 23. In other embodiments, the head support 60 may be connected to the device 20 in a different configuration and/or location.

The head support 60 in the embodiment of FIGS. 17-20 is made from multiple materials with different functionalities. In this embodiment, the head support 60 includes at least a first portion made from a low-friction material 67 and a second portion made from a stretchable and/or elastic material 68. In this embodiment, the materials of the first and second portions 67, 68 are different from each other, such that the low-friction material 67 has a lower coefficient of friction than the flexible material 68, and the elastic material 68 has greater elasticity and is capable of a greater degree of stretching than the low-friction material 67. In one embodiment, the low-friction material 67 may be the same or similar to the material forming the sheet 15, such as polyester and/or nylon (polyamide), for example, a coated nylon taffeta material. Additionally, in one embodiment, the flexible material 68 may be a Lycra/Spandex material, such as the material of the head support 60 in the embodiment of FIGS. 1-8. The head support 60 may further have additional materials, such as a support material 63 connected along the edges of the head support 60, to provide structural support, as described above with respect to FIGS. 1-8. In the embodiment illustrated in FIGS. 17-20, the central portion of the head support 50 is made from a strip of the low-friction material 67, with a webbing of the elastic material 68 extending between the support material 63 and the low friction material 67 on both sides of the low-friction material 67. These materials may be connected by stitching or other connection techniques. The use of the low-friction material 67 in the configuration shown in FIGS. 17-20 creates less friction on the patient's head during lifting, which decreases forward bending of the head and neck of the patient 11, thereby decreasing unnecessary stress on the patient 11. The webbing of the elastic material 68 in the embodiment of FIGS. 17-20 permits the head support 60 to cushion and cradle the patient's head in the same or similar manner to the elastic structure in the embodiment of FIGS. 1-8. In another embodiment, the elastic material 68 may form a complete webbing of the head support 60, and the low-friction material 67 may be a layer or coating connected to the top surface of the elastic material 68 (i.e., the surface that contacts the patient's head). In further embodiments, the head support 60 may be made from additional materials and/or alternate structures.

As described above, the additional components and functionality of the device 20 of FIGS. 17-20 are generally the same as those described above with respect to the embodiment of FIGS. 1-8. Likewise, the method of use and corresponding functionality of the device 20 of FIGS. 17-20 are also generally the same as those described above with respect to the embodiment of FIGS. 1-8, except as otherwise noted above.

Figure 11:
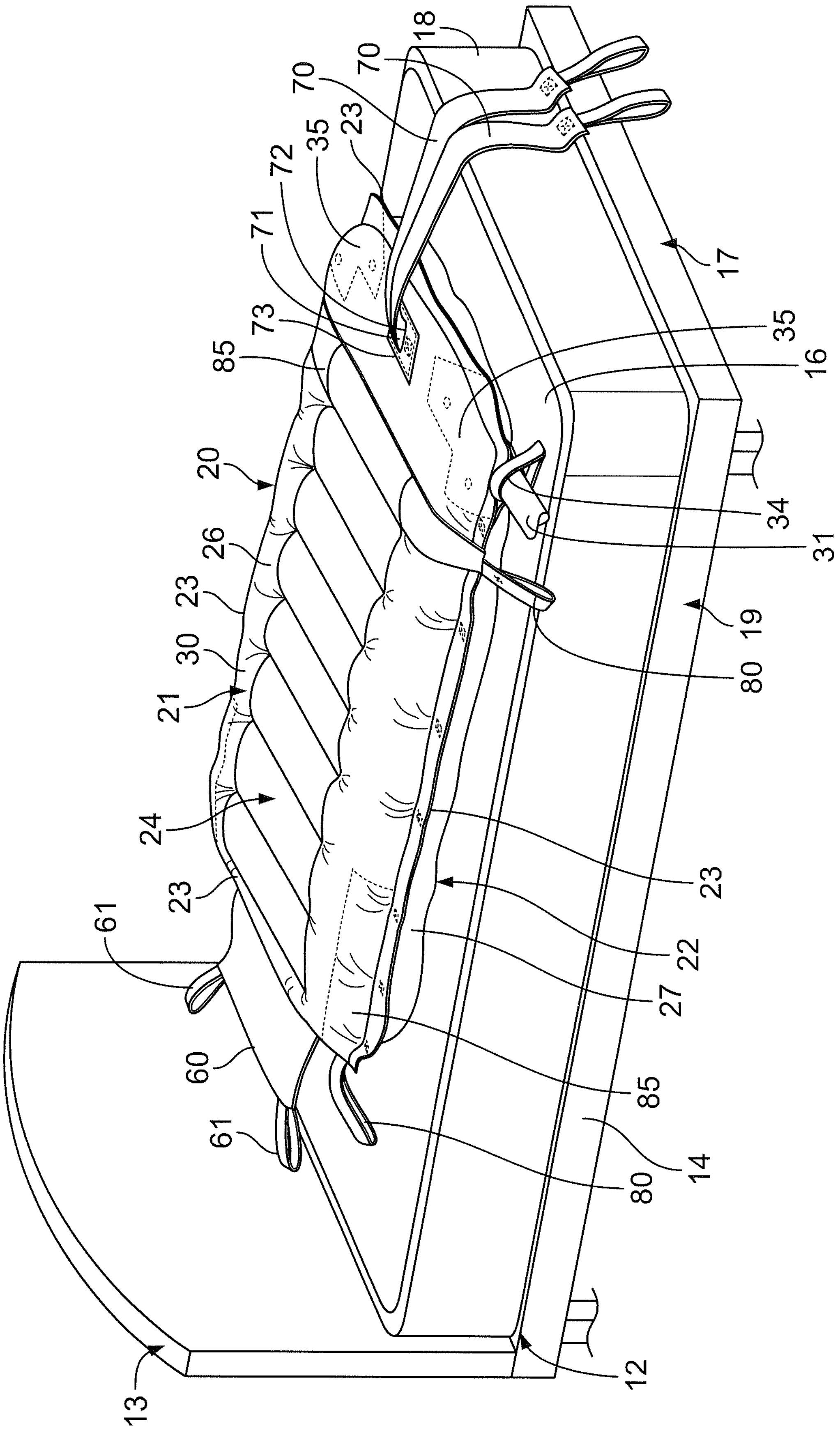
FIG. 11 is a perspective view of a portion of another embodiment of a system for use in turning and positioning a patient and a patient support device according to aspects of the disclosure, where the device is inflated.
Figure 12:
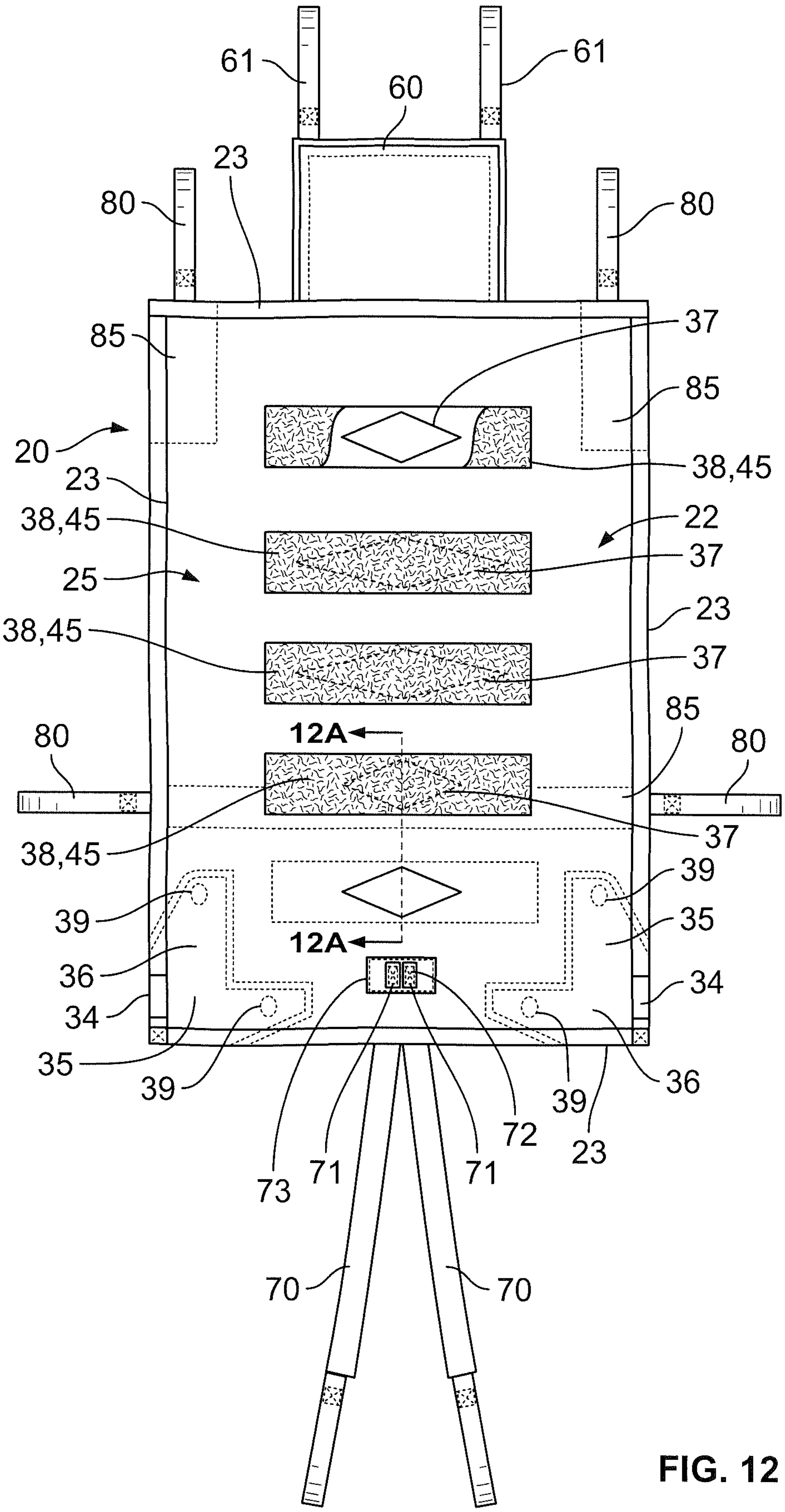
FIG. 12 is a bottom view of the device of FIG. 11, where the device is not inflated.
Figure 12A:
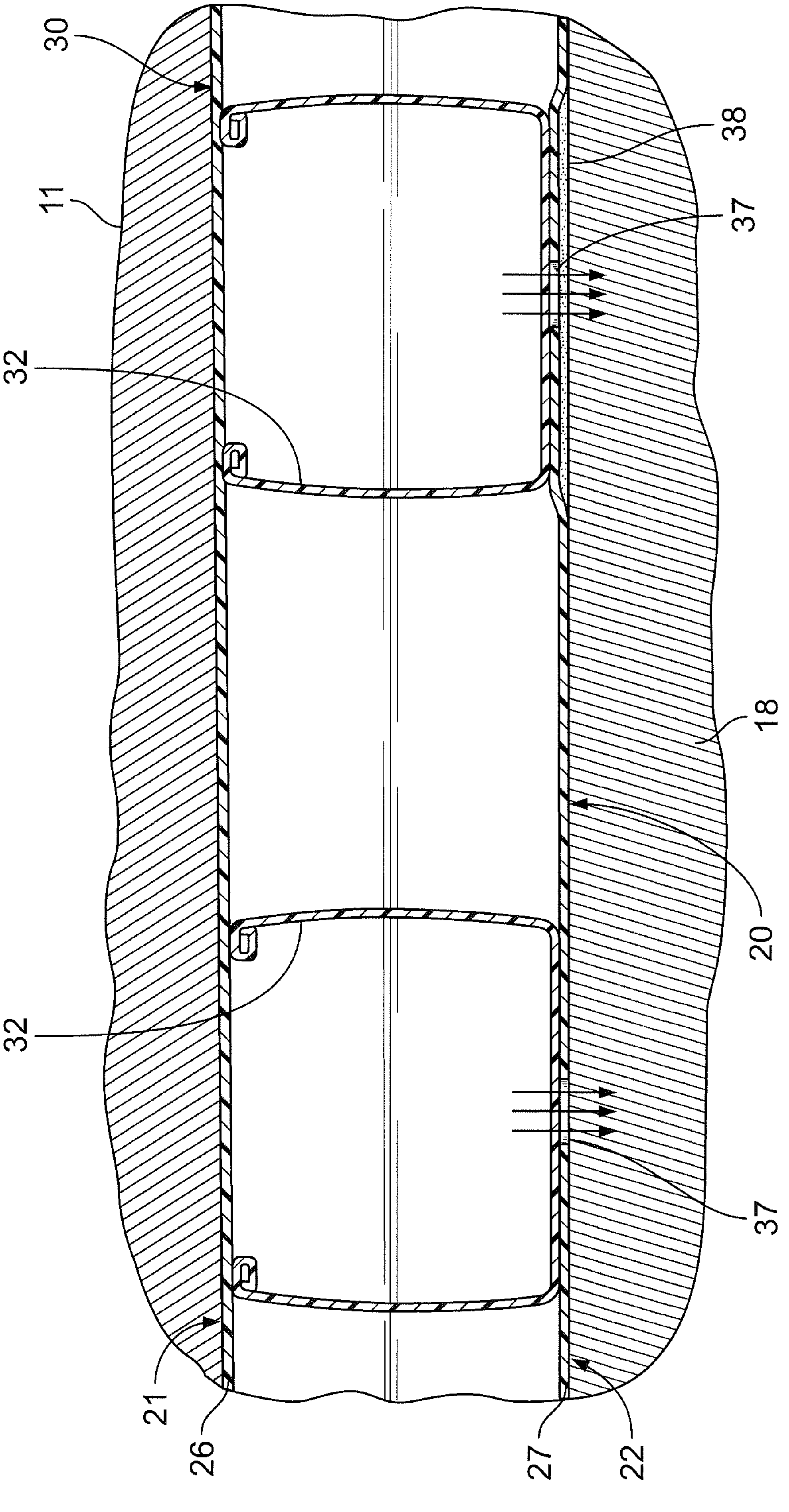
FIG. 12A is a cross-sectional view taken along lines 12A-12A of FIG. 12, shown with the device inflated and a patient supported by the device.

FIGS. 11-12A illustrate another embodiment of a patient support device 20 for use in connection with a system or apparatus 10 as described above. It is understood that the device 20 in FIGS. 11-12A may be used in connection with the wedges 50A-B, the absorbent body pad 40, and other components of the system 10 as described elsewhere herein, and the use of the device 20 of FIGS. 11-12A in connection with these other components is not illustrated or described in detail herein for the sake of brevity. Additionally, the device 20 of FIGS. 11-12A includes many components and features that are similar or identical to the components and features of the device 20 described herein with respect to other embodiments, e.g., the embodiments in FIGS. 1-8 and 17-20. Such similar or identical components are referred to using similar reference numbers and may not be described again in detail with respect to FIGS. 11-12A, for the sake of brevity. In general, the device 20 in FIGS. 11-12A is described with respect to the differences from the embodiments of FIGS. 1-8 and 17-20, and the features shown in FIGS. 11-12A may be considered to be the same as the corresponding features in FIGS. 1-8 and 17-20 unless shown or described differently. It is understood that the device 20 in FIGS. 11-12A may include any of the components, features, or variations thereof described elsewhere herein with respect to other embodiments, and that other embodiments described herein may include one or more features of the device 20 in FIGS. 11-12A, where there is no structural or functional conflict by doing such a combination.

In general, the device 20 in FIGS. 11-12A is inflatable when in use beneath the patient 11, and the device 20 is flexible and foldable when in the non-inflated state. The device 20 generally includes an inflatable body 30 that includes an internal cavity configured to be inflated with air or another gaseous substance. The inflatable body 30 is formed by a sheet 15 defined by at least a top sheet 26 forming a top wall of the cavity and a bottom sheet 27 forming a bottom wall of the cavity, with the top sheet 26 and the bottom sheet 27 connected together to define the cavity between them. In the embodiment shown in FIGS. 11-12A, the top and bottom sheets 26, 27 are two separate pieces of sheet material that are connected together around their peripheries, such as by stitching and/or adhesives, or one or more other connection techniques described herein. In other embodiments, the top and bottom sheets 26, 27 may be made from a single piece of material that is folded over and connected by stitching along the free ends or that is formed in a loop, or the top and/or bottom sheets 26, 27 may be formed of multiple pieces. Both the top and bottom sheets 26, 27 may be formed of the same material in one embodiment, although these components may be formed of different materials in another embodiment. It is understood that either or both of the sheets 26, 27 may have a single layer or multiple layers that may be formed of the same or different materials. In one embodiment, both the top and bottom sheets 26, 27 are made from the low-friction material 25 as discussed above, such as by using a low-friction sheet material, and the high-friction material 24 may be connected to at least the top sheet 26. For example, the high-friction material 24 may be or include a coating applied to the inflatable body 30, such as a spray coating. In the embodiment of FIGS. 11-12A, both the top and bottom sheets 26, 27 include the coating of the high friction material 24, with the coating on the top sheet 26 facing outward to form part of the top surface 21 of the device 20 and the coating on the bottom sheet 27 facing inwardly to form a surface of the cavity. This inward-facing high-friction coating on the bottom sheet 27 can resist slipping of the top and bottom sheets 26, 27 with respect to each other. In other embodiments, the high-friction material 24 and low friction material 25 in the device 20 of FIGS. 11-12A may be configured according to any other configuration described herein. The material(s) of the top and bottom sheets 26, 27 may also be breathable and/or may have any other properties as described herein.

The inflatable body 30 of the device 20 may include one or more inflation-limiting members to create a specific inflated shape 20 for the device. For example, in the embodiment illustrated in FIGS. 11-12A, the inflatable body 30 may include a plurality of gussets, walls, baffles, etc., connected to the top sheet 26 and the bottom sheet 27 and extending across the cavity. FIG. 12A illustrates a gusset 32 connecting the top and bottom sheets 26, 27, where the gusset 32 has a U-shape in cross-section, and the gussets 32 may be elongated, such that the U-shaped cross-section is extended in a direction between the side edges 23 and generally parallel to the head and foot edges 23 of the device 20. The fully inflated device 20 has a shape that is defined by the configuration of the edges 23 of the device 20 and the size, shape, and configurations of the gussets 32, among other factors.

The device 20 as illustrated in FIGS. 11-12A includes a plurality of holes 37 in the bottom sheet 27 that permit air to pass from the cavity to the exterior of the device 20. The holes 37 extend from the cavity through the bottom sheet 27 to the exterior of the device 20 on the bottom surface 22. Air passing through the holes 37 is forced between the bottom surface 22 of the device 20 and the surface upon which the device 20 sits (e.g., the supporting surface 16 of the bed 12), creating an "air cushion" that reduces friction between the bottom surface 22 and the supporting surface. Passage of air through the holes 37 is illustrated in FIG. 12A. This permits easier movement of the device 20 when a patient 11 is positioned on the device 20, particularly lateral movement, as described in greater detail elsewhere herein. The holes 37 in the embodiment of FIGS. 11-12A are located immediately below the gussets 32, and the gussets 32 are made of air-permeable material, such that air passes through the bottom of the gusset 32 to exit the hole 37. The gussets 32 in this configuration can function to limit the air flow through the holes 37 to maintain a desired level of inflation of the device 20, as well as to diffuse the air flowing out of the holes 37 to improve the friction-reducing "air cushion" created by the air escaping through the holes 37. Air may pass through the holes 37 in a different manner in another embodiment, such as passing around the gussets 32 or the holes 37 not being positioned beneath the gussets 32.

The holes 37 in the embodiment of FIGS. 11-12A are arranged in diamond shapes or other shapes that have narrowed ends and a wider central portion, which keeps most of the air passage through the holes 37 proximate the center of the device 20 and helps avoid excess air loss when the edges of the device 20 are lifted. Other configurations of holes 37 may be used in other embodiments, including the use of multiple smaller holes 37 in close proximity, rather than a single, larger hole 37. The device 20 in the embodiment of FIGS. 11-12A may further include covers 38 that cover at least some of the holes 37, where the covers 38 are air-permeable and permit air to flow through them to form the air cushion beneath the device 20. The covers 38 may be connected to the device 20 using any connection technique described herein. Additionally, some or all of the covers 38 (if present) may be formed of a directional stitching material 45, which is configured to interact with contacting surfaces of the wedge(s) 50A-B and/or the bed 12 to limit sliding of the device 20 in one or more directions. In this configuration, the covers 38 may take the place of the engagement members 46 of the directional stitching material 45 as shown in FIGS. 1-8, such that the covers 38 function as engagement members for a selective gliding assembly 41 as described herein. It is understood that in another embodiment, one or more separate engagement members 46 of directional stitching material 45 may be used on the device 20 in FIGS. 11-12A, in which the covers 38 may or may not be formed of the directional stitching material 45 or may not be present at all.

The device 20 may be inflated by connection to an air output 31, such as a hose connected to an air pump (not shown) as illustrated in FIG. 11, and may include one or more inflation ports 34 for connection to the air output 31. Deflation can be accomplished by simply shutting off and/or removing the air output 31. In the embodiment of FIGS. 11-12A, the device 20 includes two inflation ports 34, each located along one of the side edges 23 of the device 20, proximate the foot edge 23. Generally, only one of the inflation ports 34 is used at a time, and the dual ports 34 provide for use in diverse arrangements, although both ports 34 could be used simultaneously. The ports 34 may include various fastening and/or cinching structures to securely fit the air output 31. The device 20 may also have a valve 35 in communication with the port 34, as illustrated in FIGS. 11-12. The valve 35 in this embodiment is formed by a pocket 36 that is positioned within the cavity and in communication with the port 34, with the valve 35 having exit openings 39 in communication with the cavity. The valve 35 is shown as an L-shaped structure in the embodiment of FIGS. 11-12. The valve 35 may perform multiple functions, such as compressing when there is no inward airflow to resist or prevent reverse airflow through the port 34, reducing noise and dispersion of the air during inflation, protecting the air output 31 from contact with dirt, dust, debris, and other matter that may be present within the device 20, and the positioning of the exit openings 39 in the embodiment illustrated in FIGS. 11-12 makes it difficult or impossible for the patient's leg to rest on top of both of the exit openings 39 to impede air flow through the valve 35.

As described above, the additional components and functionality of the device 20 of FIGS. 11-12A are generally the same as those described above with respect to the embodiments of FIGS. 1-8 and 17-20. Likewise, the method of use and corresponding functionality of the device 20 of FIGS. 11-12A are also generally the same as those described above with respect to the embodiments of FIGS. 1-8 and 17-20, except as otherwise noted above.

All or some of the components of the system 10 can be provided in a kit, which may be in a pre-packaged arrangement, as described in U.S. Patent Application Publication No. 2012/0186012, published Jul. 26, 2012, which is incorporated by reference herein in its entirety and made part hereof. For example, the device 20 and the pad 40 may be provided in a pre-folded arrangement or assembly, with the pad 40 positioned in confronting relation with the top surface 21 of the device 20, in approximately the same position that they would be positioned in use, and the device 20 and pad 40 can be pre-folded to form a pre-folded assembly. It is understood that the device 20 in the embodiment of FIGS. 11-12A may be deflated before folding. This pre-folded assembly can be unfolded when placed beneath a patient. It is understood that different folding patterns can be used. The pre-folded device 20 and pad 40 can then be unfolded together on the bed 12, as described below, to facilitate use of the system 10. Additionally, the device 20 and the pad 40 can be packaged together by wrapping with a packaging material to form a package and may be placed in the pre-folded assembly before packaging. The one or more wedges 50 and/or the pump (not shown) may also be included in the package, in one embodiment. Other packaging arrangements may be used in other embodiments.

An example embodiment of a method for utilizing the system 10 for lifting the patient 11 is illustrated in part in FIGS. 7-8 with respect to the embodiment in FIGS. 1-8. It is understood that the other embodiments shown and described herein may be utilized in the same or a similar method, with the same or similar functionality. As described above, the device 20 and the pad 40 may be provided as a pre-folded assembly, and the device 20 and pad 40 together may be placed beneath the patient in a pre-folded state. Examples of methods for placing the device 20 and the pad 40 beneath the patient and for removing and replacing the pad 40 are shown and described in U.S. Pat. No. 8,789,533, which is incorporated by reference herein. Once the device 20 and the pad 40 are placed beneath the patient 11, the device 20 can be connected to a hoist 90 for lifting the patient 11, the device 20, and (if present) the pad 40. In the embodiment of FIGS. 1-8, the head support straps 61, the central support straps 70, and the peripheral straps 80 can be connected to the hoist 90 by using the connection structures 62, 74, 82. The hoist 90 may have a support structure 91 (e.g., spreader bars) for connection to the straps 61, 70, 80, and the connection structures 62, 74, 82 of the straps 61, 70, 80 may be configured for connection to the support structure 91 of the hoist 90. The extension of the peripheral straps 80 in the embodiment of FIGS. 1-8 causes stretching of the retraction straps 81, as described herein. Additionally, the connection of the head support straps 61 to the hoist 90 causes the head support 60 to wrap partially around the head of the patient 11, cradling the head and pulling the head forward slightly, as shown in FIG. 7.

Once all the straps 61, 70, 80 are connected to the support structure 91, the hoist 90 can be activated to raise the device 20 and the patient 11, as shown in FIG. 8. The head support 60 holds the head of the patient 11 forward to prevent the head from hanging backward during lifting while providing sufficient stretching to cradle the patient's head and to avoid pushing the patient's head downward toward the chest. The peripheral straps 80 near the head edge 23 of the device 20 also provide support for the patient's upper body. Additionally, because the lengths of the head support straps 61 and the peripheral straps 80 near the head edge 23 are shorter relative to the lengths of the central support straps 70 and the peripheral straps 80 in the middle region of the device 20, the head and upper body of the patient 11 are lifted higher relative to the patient's lower body, causing the patient 11 to be positioned in an upright position similar to a sitting position, as shown in FIG. 8. In one embodiment, the upper body and lower body of the patient 11 may be positioned at approximately a 90° angle in this configuration. This strap configuration also permits gradual lifting of the patient 11, where the patient's upper body is lifted upward before the lower body. The central support straps 70 connected in the central area of the device 20 support the legs of the patient 11 while ensuring that the legs are separated and creating a "saddle" configuration so the patient 11 does not slide forward off of the device 20. The peripheral straps 80 in the middle region of the device 20 also support the patient's lower body and prevent the patient's legs from splaying too far outward, with the peripheral straps 80 and the central support straps 70 thereby creating "channels" in which the patient's legs can sit. In this position, the patient 11 can be moved easily by moving the hoist 90, which may have wheels (not shown) or other means of movement. When the patient 11 is desired to be lowered, the hoist 90 can lower the patient 11 onto the supporting surface (e.g., a bed 12), returning to the position shown in FIG. 7. The straps 61, 70, 80 can then be disconnected from the hoist 90. The device 20 can remain under the patient 11 for long periods of time, due to the breathability of the material of the sheet 15. This enables the device 20 to be used in moving and repositioning the patient 11 throughout a long period of care, such as for changing and replacing the pad 40, turning the patient 11 using the wedges 50, repositioning the patient 11 on the bed 12 by sliding the device 20 (e.g., using the handles 28), and future lifting of the patient 11 using the hoist 90, among other options.

When the device 20 is placed on the bed 12 or other supporting surface, the device can be used for placing the patient in an angled resting position by placing two wedges 50A-B under the patient 11 resting on the device 20. The method is used with a patient 11 lying on a bed 12 as described above, having a bed sheet (e.g., a fitted sheet) on the supporting surface 16, with the device 20 and pad 40 of the system 10 lying on top of the bed sheet and the patient 11 lying on the pad 40. In this embodiment, the wedges 50A-B are inserted underneath the device 20 and the patient 11 and positioned on top of the bed sheet, such that the bed sheet contacts the base wall 51 of the wedge 50A-B, and the ramp surfaces 52 of the wedges 50A-B contact the bottom surface 22 of the device 20. It is understood that no bed sheet or other cover for the mattress 18 may be present in some embodiments, in which case the wedges 50 can be placed directly on the mattress 18. To insert the wedges 50A-B, the relevant side edge 23 of the device 20 is lifted, and the wedges 50A-B are inserted from the side of the bed 12 under the device 20 toward the patient 11. The patient 11 may be rolled all the way onto his/her side for insertion of the wedges 50A-B in one embodiment. At this point, at least the apex 55 of each wedge 50A-B may be pushed toward, next to, or at least partially under the patient 11. The selective gliding assemblies 41 between the wedges 50A-B and the bottom surface 22 of the device 20 do not resist such insertion and allow free gliding of the wedge toward the patient and away from the side edge of the bed. This insertion technique may position the patient to the desired angle with no further movement of the patient 11 necessary.

In one embodiment, the wedges 50A-B should be aligned so that the wedges are spaced apart with one wedge 50A positioned at the upper body of the patient 11 and the other wedge 50B positioned at the lower body of the patient 11, with the patient's sacral area positioned in the space between the wedges 50A-B. FIG. 3 illustrates this positioning of the wedges 50A-B on one side of the device 20. It has been shown that positioning the wedges 50A-B in this arrangement can result in lower pressure in the sacral area, which can reduce the occurrence of pressure ulcers in the patient 11. The wedges 50A-B may be positioned approximately 10 cm apart in one embodiment, or another suitable distance to provide space to float the sacrum, or in other words, to have minimal force on the sacrum.

Once the wedges 50A-B and the support 80 have been inserted, the patient 11 may be in the proper angled position. If the patient 11 requires further turning to reach the desired angled position, the user (such as a caregiver) can pull the patient 11 toward the wedges 50A-B and toward the user, such as by gripping the handles 28 on the device 20. This moves the proximate edge 23 of the device 20 toward the back walls 53 of the wedges 50A-B and toward the user, and slides the patient 11 and at least a portion of the device 20 up the ramp surface 52, such that the ramp surface 52 partially supports the patient 11 to cause the patient 11 to lie in an angled position. During this pulling motion, the selective gliding assemblies 41 between the ramp surfaces 52 of the wedges 50A-B and the device 20 do not resist movement of the device 20, the engagement member 48 on the base wall 51 of the wedge 50A resists movement of the wedge 50A toward the user (i.e., away from the patient 11 and toward the side edge of the bed 12), and the high friction surface 24 of the device 20 resists movement of the pad 40 and/or the patient 11 with respect to the device 20 during this movement as well.

When the patient 11 is to be returned to lying on his/her back, the wedges 50A-B can be removed from under the patient 11. The device 20 may be pulled in the opposite direction in order to facilitate removal of the wedges 50A-B and/or to position the patient 11 closer to the center of the bed 12. The patient 11 can be turned in the opposite direction by inserting the wedges 50A-B under the opposite side of the device 20, from the opposite side of the bed 12, and optionally pulling the device 20 in the opposite direction to move the patient 11 up the ramp surfaces 52 of the wedges 50A-B, in the same manner described above.

Once the wedges 50A-B are positioned beneath the patient 11 and the device 20, the various selective gliding assemblies 41 resist undesirable movement of the patient 11 and the device 20. For example, the selective gliding assemblies 41 between the ramp surfaces 52 of the wedges 50A-B and the bottom surface 22 of the device 20 resist slipping of the device 20 down the ramp surfaces 52, and also resist slipping of the device 20 downward toward the foot 17 of the bed 12, and further resist slipping of the wedges 50A-B rearward away from the patient 11 and toward the side edge of the bed 12. As another example, the engagement members 48 and the corresponding selective gliding assemblies 41 on the base walls 51 of the wedges 50A-B resist slipping of the wedges 50A-B rearward away from the patient 11 and toward the side edge of the bed 12. These features in combination provide increased positional stability to the patient 11 as compared to existing turning and/or positioning systems, thereby reducing the frequency and degree of necessary repositioning. The patient 11, the pad 40, the device 20, and the wedges 50A-B tend to move "together" on the bed 12 in this configuration, so that these components are not unacceptably shifted in position relative to each other. This, in turn, assists in maintaining the patient 11 in optimal position for greater periods of time and reduces strain and workload for caregivers. To the extent that repositioning is necessary, the handles 28 on the device 20 are configured to assist with such repositioning in a manner that reduces strain on caregivers.

As described above, in some embodiments, the wedges 50A-B may have an angle of up to approximately 45°, or from approximately 15-35°, or approximately 30°. Thus, when these embodiments of wedges 50A-B are used in connection with the method as shown and described herein, the patient 11 need not be rotated or angled more than 45°, 35°, or 30°, depending on the wedge 50A-B configuration. The degree of rotation can be determined by the rotation or angle from the horizontal (supine) position of a line extending through the shoulders of the patient 11. Existing methods of turning and positioning patients to relieve sacral pressure often require rolling a patient to 90° or more to insert pillows or other supporting devices underneath. Rolling patients to these great angles can cause stress and destabilize some patients, particularly in patients with critical illnesses or injuries, and some critical patients cannot be rolled to such great angles, making turning of the patient difficult. Accordingly, the system 10 and method described above can have a positive effect on patient health and comfort. Additionally, the angled nature of the wedges 50A-B can allow for more accurate positioning of the patient 11 to a given resting angle, as compared to existing, imprecise techniques such as using pillows for support. Further, the selective gliding assemblies 41 resist undesired slipping with respect to the wedges 50A-B, which aids in maintaining the same turning angle.

The use of the system 10 and methods described above can significantly decrease the number of pressure ulcers in patients. The system 10 reduces pressure ulcers in a variety of manners, including reducing pressure on sensitive areas, reducing shearing and friction on the patient's skin, and managing heat and moisture at the patient's skin. The system 10 can reduce pressure on the patient's skin by facilitating frequent turning of the patient and providing consistent support for accurate resting angles for the patient upon turning. The system 10 can reduce friction and shearing on the patient's skin by resisting sliding of the patient along the bed 12, including resisting sliding of the patient downward after the head 13 of the bed 12 is inclined, as well as by permitting the patient to be moved by sliding the device 20 against the bed 12 instead of sliding the patient. Additionally, as described above, the use of the selective gliding assemblies and high/low friction surfaces creates a configuration where the device 20, the pad 40, the patient 11, and the wedges 50A-B all move "as one" on the bed so that the patient 11 stays in the proper turned position and less repositioning of the patient is necessary. The system 10 can provide effective heat and moisture management for the patient by the use of the absorbent body pad. The breathable properties of the device 20 and pad 40 are particularly beneficial when used in conjunction with an LAL bed system. The breathability of the device 20 and the pad 40 also permits the system 10 to be placed underneath the patient 11 for extended periods of time. When used properly, pressure ulcers can be further reduced or eliminated.

The use of the system 10 and methods described above can also have beneficial effects for nurses or other caregivers who turn and position patients. Such caregivers frequently report injuries to the hands, wrists, shoulders, back, and other areas that are incurred when moving patients. Use of the system 10, including the device 20 and the wedges 50A-B, can reduce the strain on caregivers when turning and positioning patients. For example, existing methods for turning and positioning a patient 11, such as methods including the use of a folded-up bed sheet for moving the patient 11, typically utilize lifting and rolling to move the patient 11, rather than sliding. Protocols for these existing techniques encourage lifting to move the patient and actively discourage sliding the patient, as sliding the patient using existing systems and apparatuses can cause friction and shearing on the patient's skin. The ease of motion and reduction in shearing and friction forces on the patient 11 provided by the system 10 allows sliding of the patient 11, which greatly reduces stress and fatigue on caregivers while moving and/or turning the patient 11. The configuration of the straps 61, 70, 80 in the embodiments described herein permit the patient 11 to be easily lifted using a hoist 90 in a manner that does not place excessive strain on the patient 11 and that keeps the patient 11 securely positioned on top of the device 20. The retraction mechanisms for the peripheral straps 80 described herein assist in keeping the straps 80 out of the way of the patient 11 and caregivers, enhancing safety as described above. Such retraction mechanisms can achieve similar benefits when used in connection with any other straps 61, 70 described herein, as well as in other applications. Still other benefits and advantages over existing technology are provided by the system 10 and methods described herein, and those skilled in the art will recognize such benefits and advantages.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," etc., as used herein, are intended for illustrative purposes only and do not limit the embodiments in any way. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention.

What is claimed is:

1. A device comprising:

a sheet configured to support an upper body of a patient when the sheet and the patient are lifted, the sheet defined by a first plurality of peripheral edges, including a head edge; and a head support extending outwardly from the head edge and configured to support a head of the patient when the sheet is lifted, the head support comprising:

a first portion extending away from the head edge and having a first elasticity, and a second portion extending away from the head edge adjacent the first portion and having a second elasticity, wherein the second elasticity is greater than the first elasticity.

2. The device of claim 1, wherein the first portion has a first coefficient of friction and the second portion has a second coefficient of friction, wherein the first coefficient of friction is lower than the second coefficient of friction.

3. The device of claim 1, further comprising a third portion extending away from the head edge and having a third elasticity greater than the first elasticity, wherein the first portion is positioned between the second portion and the third portion.

4. The device of claim 3, wherein the third elasticity is the same as the second elasticity.

5. The device of claim 1, further comprising:

a head support strap coupled to the head support; and a peripheral strap coupled to a peripheral edge of the first plurality of peripheral edges.

6. The device of claim 5, wherein the head support is further configured to maintain the head of the patient in an inclined position when the sheet is lifted.

7. The device of claim 5, wherein the peripheral strap is configured to couple to a hoist for lifting of the patient.

8. The device of claim 5, wherein the head support strap is configured to couple to a hoist for lifting of the head of the patient.

9. The device of claim 5, wherein the head support includes a flap configured to extend across a forehead of the head of the patient when the sheet is lifted.

10. The device of claim 9, wherein the flap is releasably connected to the head support.

11. The device of claim 5, wherein the head support is at least partially formed of a stretchable material with greater elasticity than materials of the sheet.

12. A method comprising:

placing a patient above a top surface of a rectangular sheet, the rectangular sheet defined by a first plurality of peripheral edges, including a head edge;

placing a head of the patient on a head support, wherein the head support extends outwardly from the head edge, the head support comprising:

a first portion extending away from the head edge and having a first elasticity; and a second portion extending away from the head edge adjacent the first portion and having a second elasticity, wherein the second elasticity is greater than the first elasticity; and lifting the rectangular sheet, wherein the head support is configured to support the head of the patient as the rectangular sheet is lifted.

13. The method of claim 12, wherein the head support is further configured to maintain the head of the patient in an inclined position as the rectangular sheet is lifted.

14. The method of claim 12, further comprising coupling one or more straps to a hoist for lifting, wherein the one or more straps are coupled to the rectangular sheet.

15. The method of claim 12, further comprising manipulating a flap into a hooded position such that the flap extends across a forehead of the head of the patient, wherein the flap is coupled to the head support.

16. The method of claim 15, wherein the flap is releasably connected to the head support.

17. A system comprising:

a patient support device comprising:

a rectangular sheet configured to support an upper body of a patient when the rectangular sheet and the patient are lifted, the rectangular sheet defined by a first plurality of peripheral edges, including a head edge;

a head support extending outwardly from the head edge and configured to support a head of the patient when the patient support device is lifted, the head support comprising:

a first portion extending away from the head edge and having a first elasticity; and a second portion extending away from the head edge adjacent the first portion and having a second elasticity, wherein the second elasticity is greater than the first elasticity; and an absorbent body pad configured to be placed over the patient support device.

18. The system of claim 17, wherein the rectangular sheet further comprises one or more straps coupled to the rectangular sheet, wherein the one or more straps are configured to couple to a hoist for lifting of the patient.

19. The system of claim 17, wherein the head support includes a flap configured to extend across a forehead of the head of the patient when the rectangular sheet is lifted.

20. The system of claim 17, further comprising one or more wedges configured to be placed under the patient support device.

* * * * *